Dec. 16, 1969  D. F. RIGBY  3,484,559
INTERSTAGE SIGNALLING SYSTEM USING DISCRETE CURRENTS OR VOLTAGES
Filed July 28, 1966  29 Sheets-Sheet 11
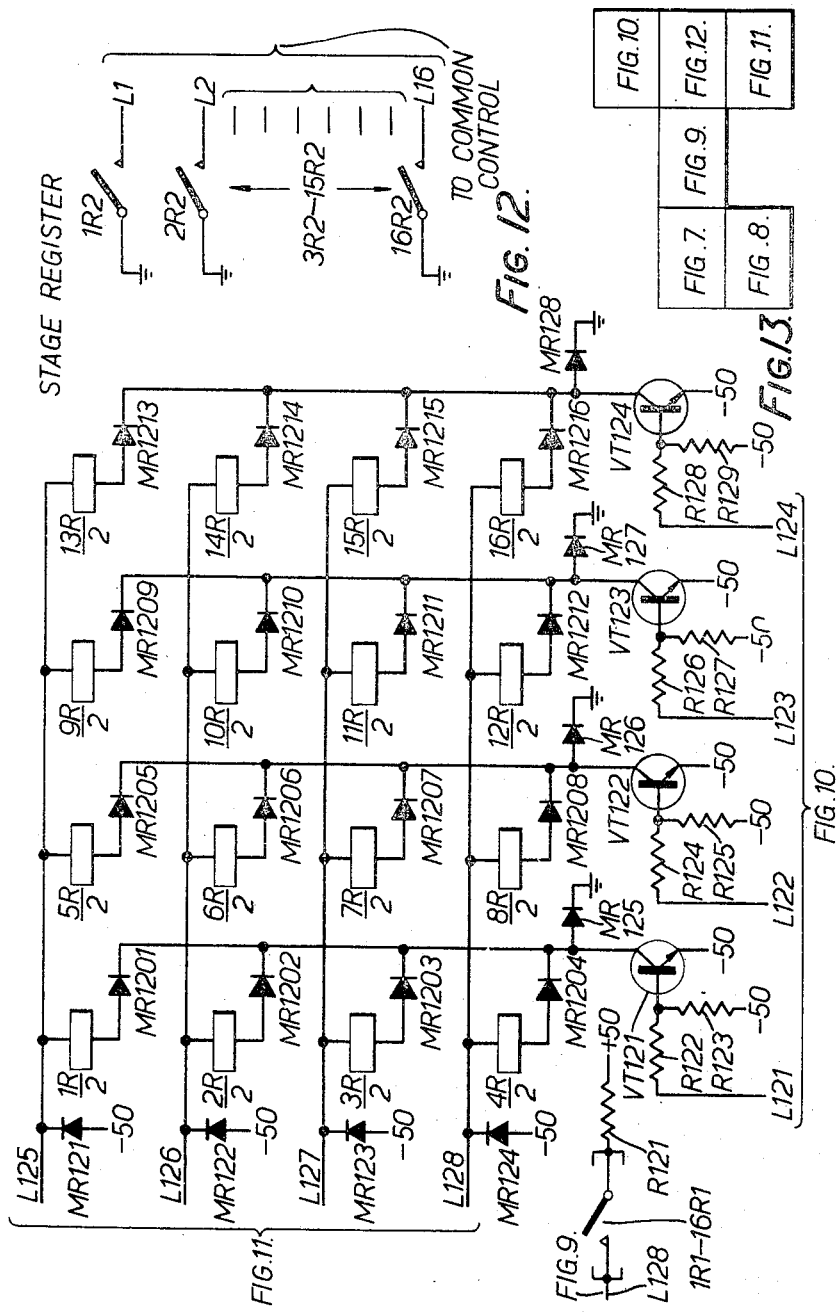

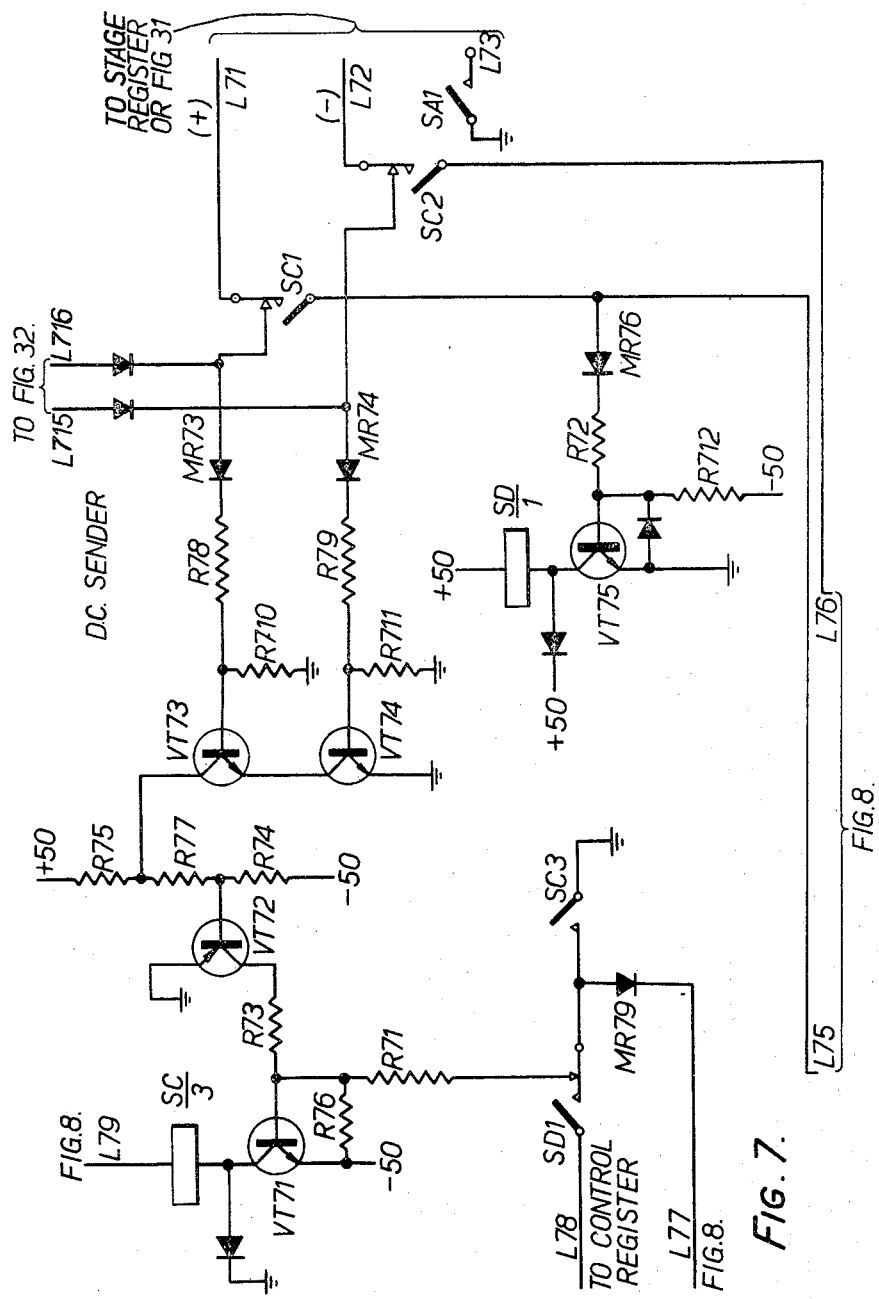

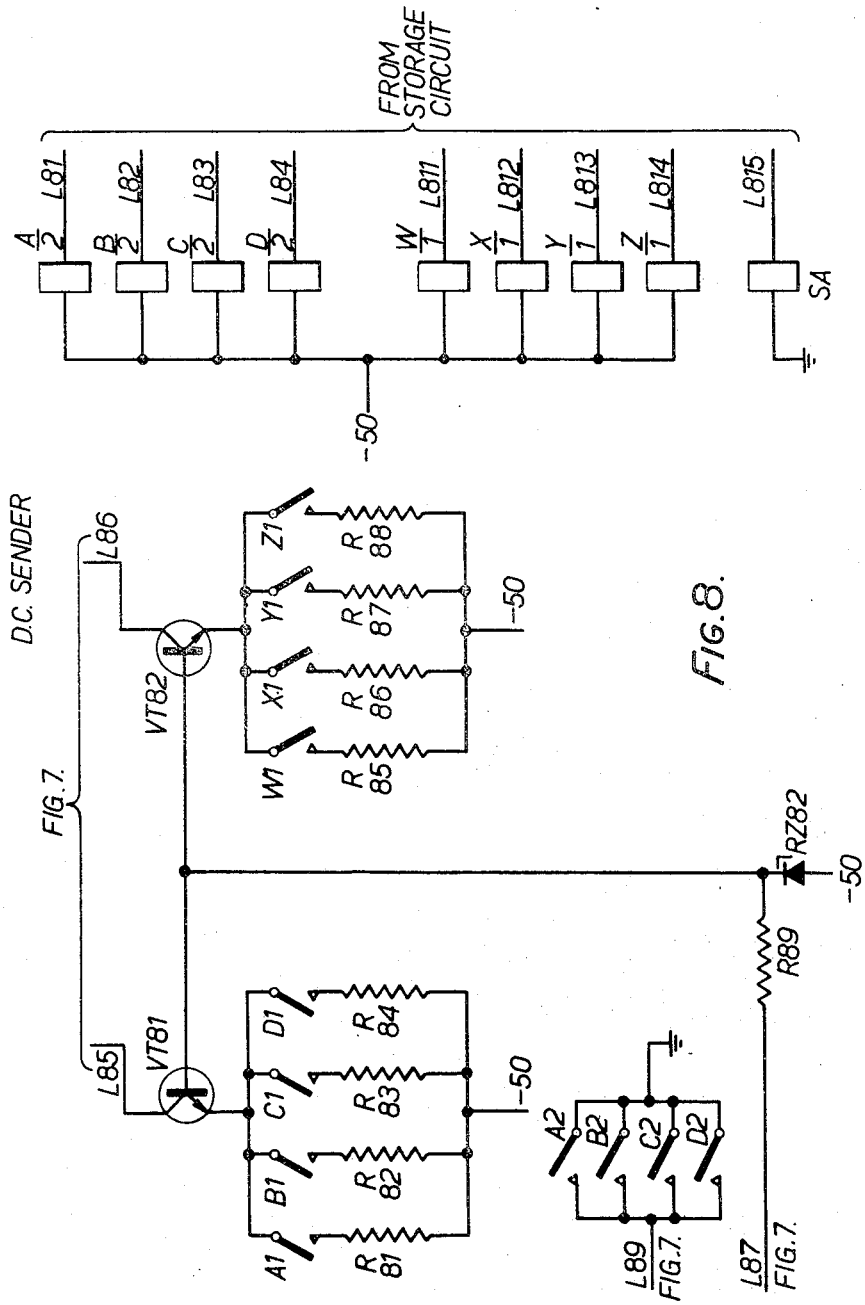

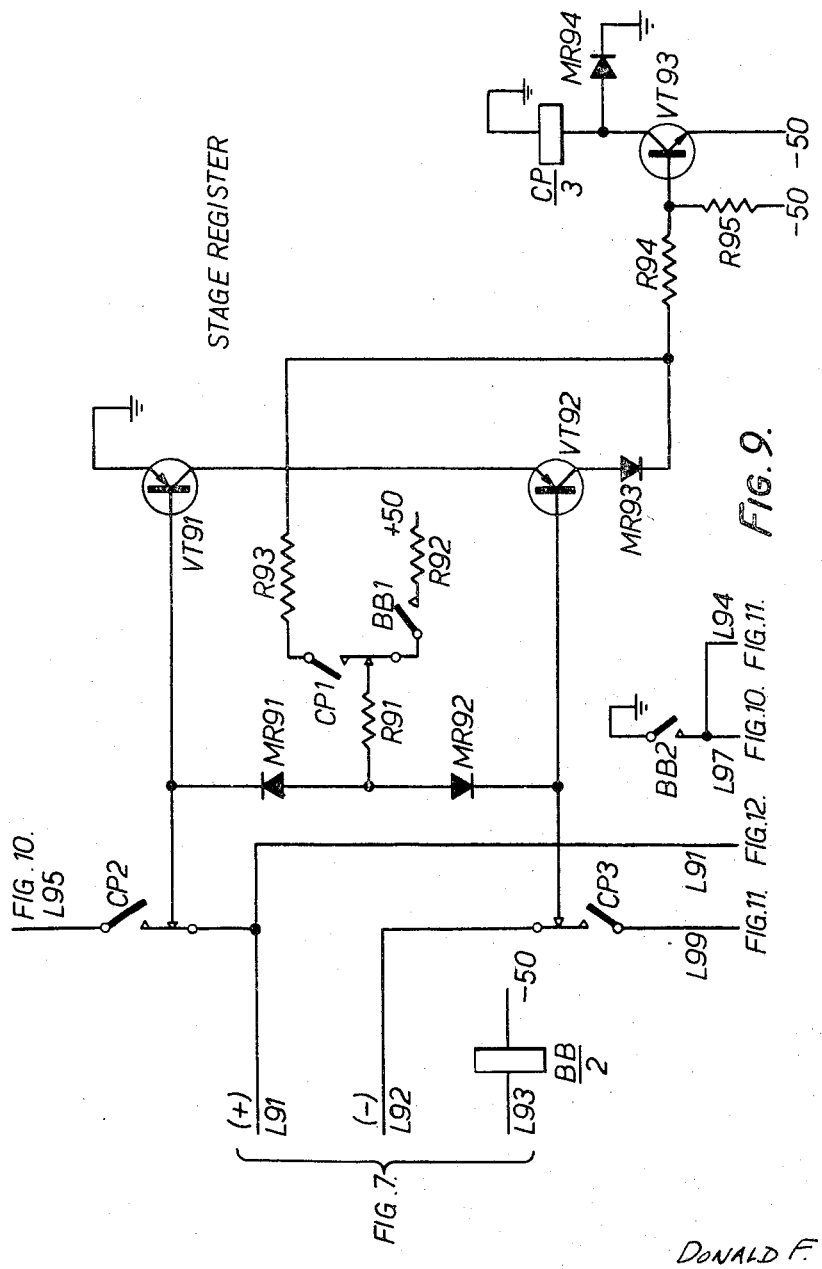

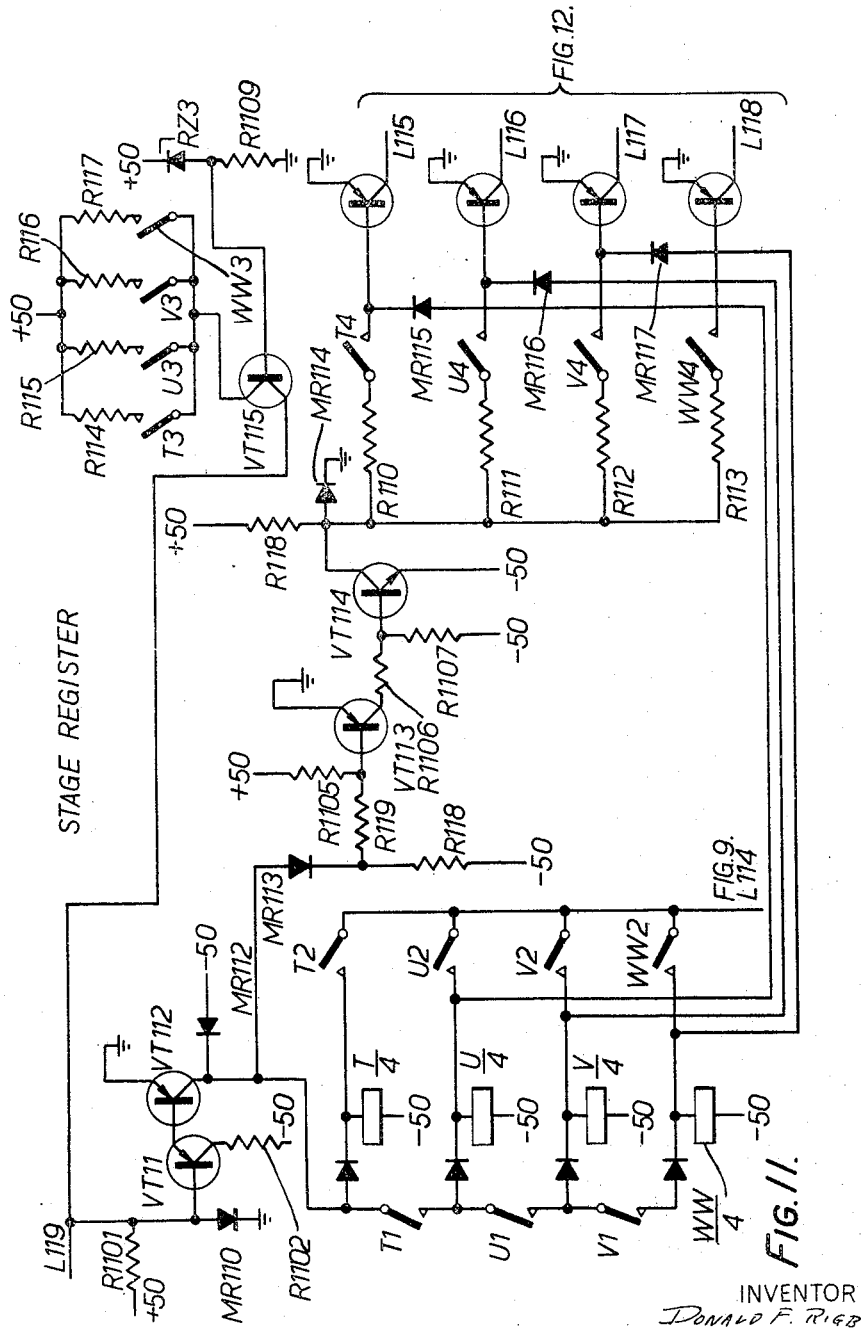

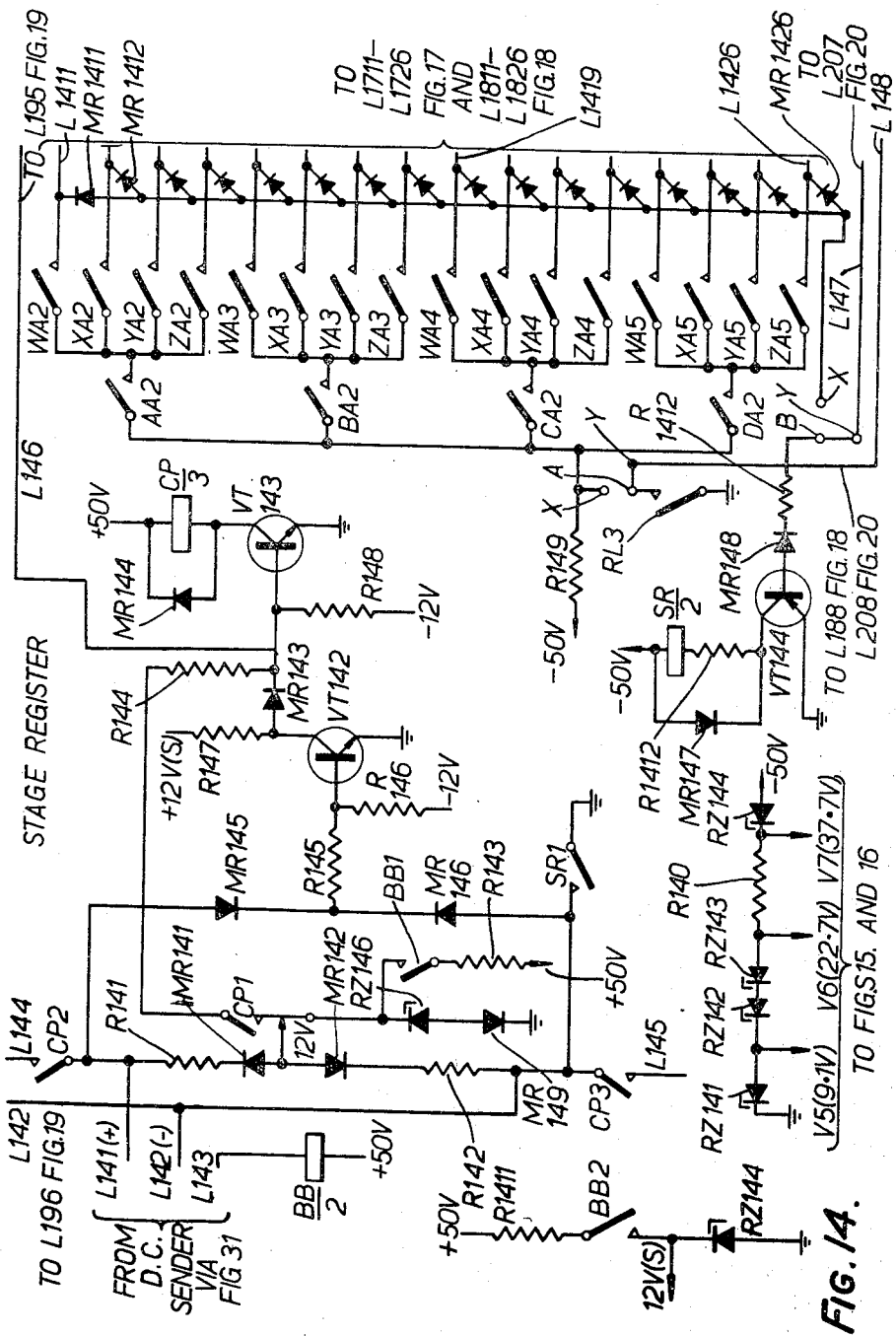

Dec. 16, 1969  D. F. RIGBY  3,484,559
INTERSTAGE SIGNALLING SYSTEM USING DISCRETE CURRENTS OR VOLTAGES
Filed July 28, 1966  29 Sheets-Sheet 15

STAGE REGISTER

Donald F. Rigby
INVENTOR
BY
ATTORNEY

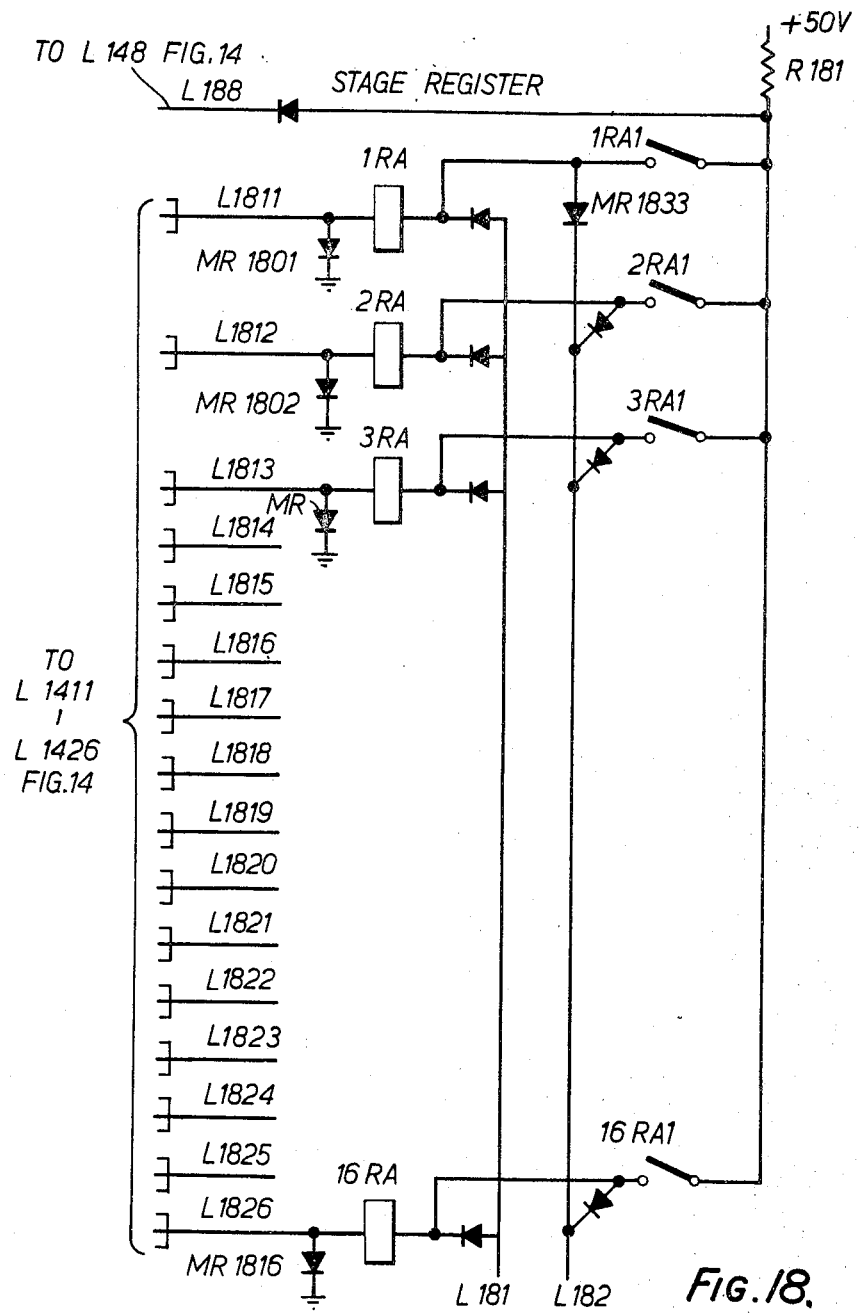

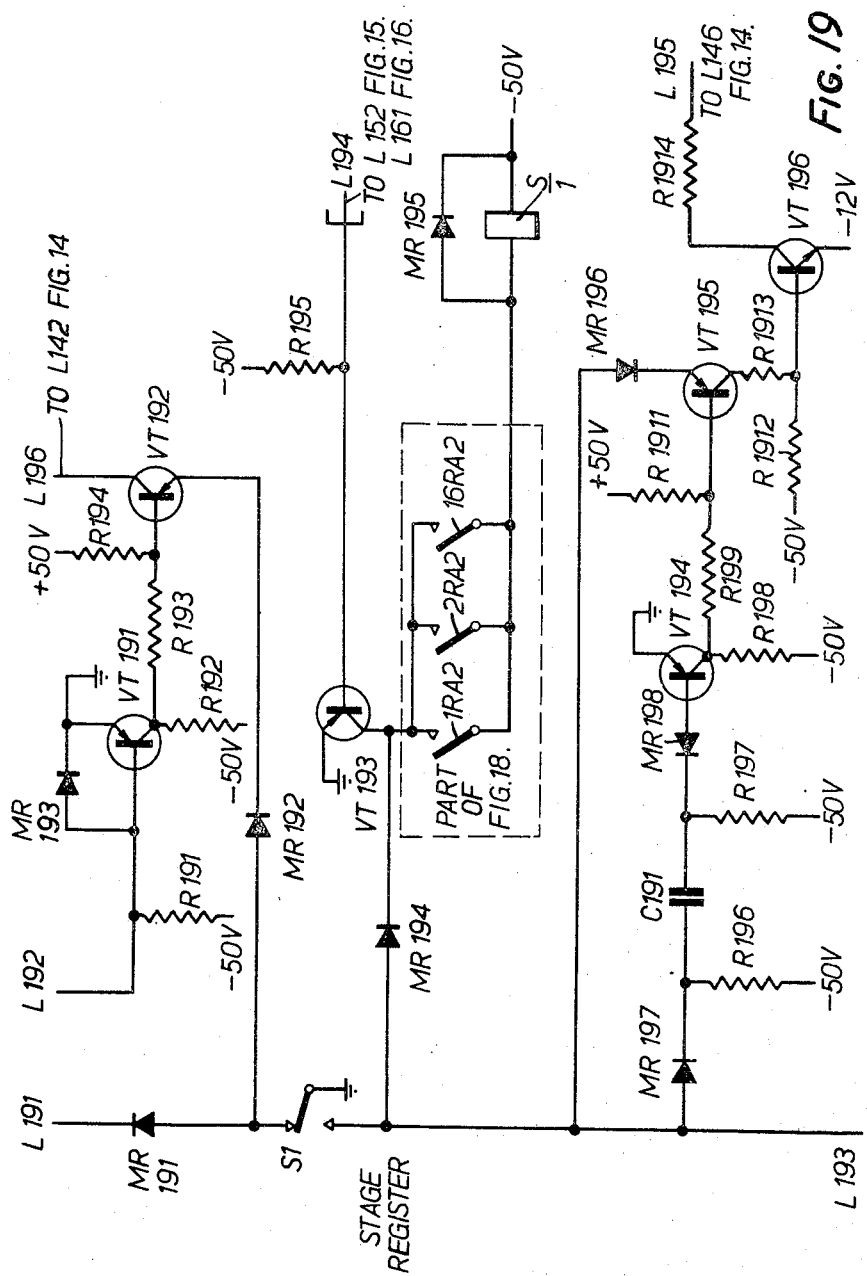

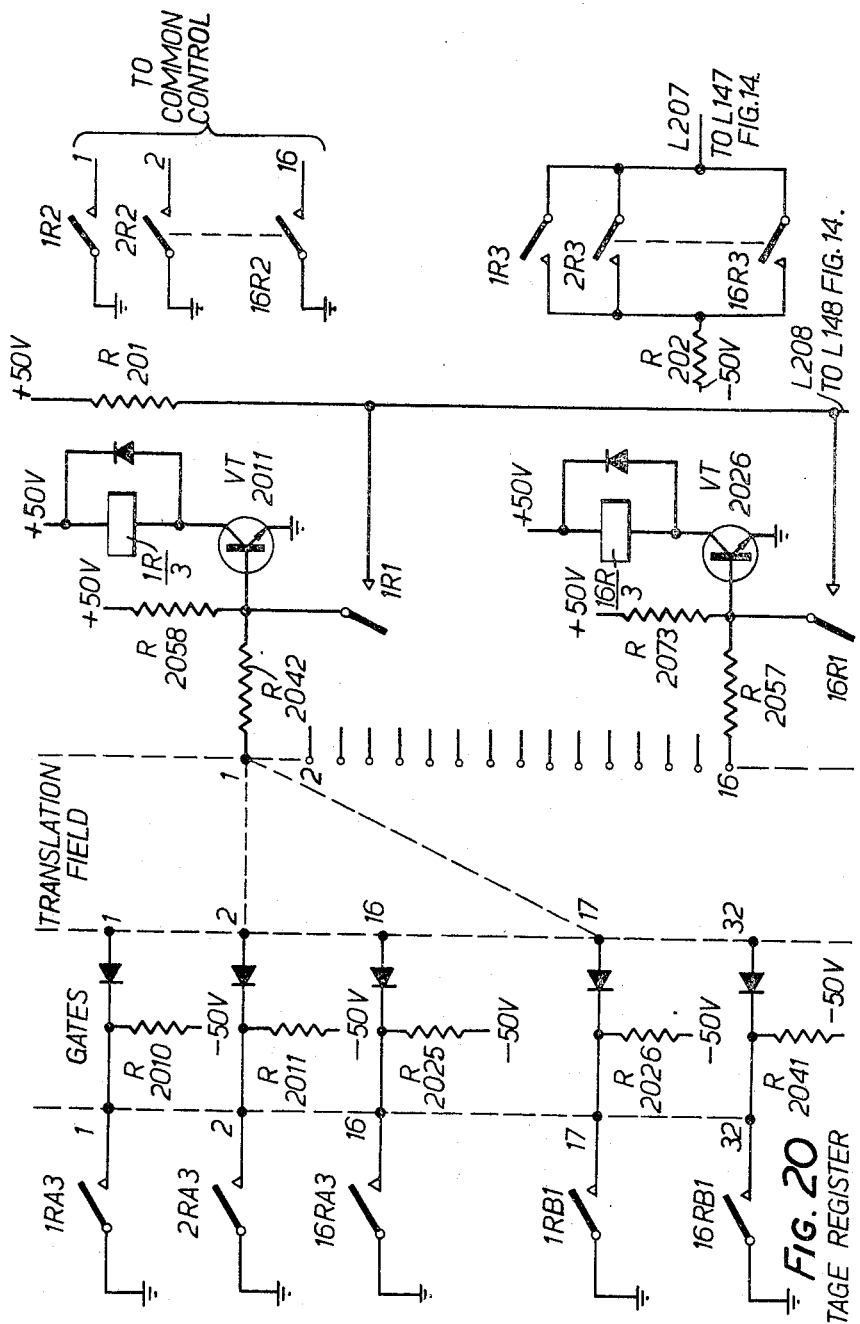

| FIG.32. |  |  | FIG. 23. | FIG. 27. |
|---|---|---|---|---|
| FIG 7 | FIG. 31 | FIG. 22 | FIG. 25 | FIG.26. |
| FIG. 8. |  |  | FIG. 24 | FIG. 28 |

DONALD F. RIGBY
INVENTOR
BY
ATTORNEY

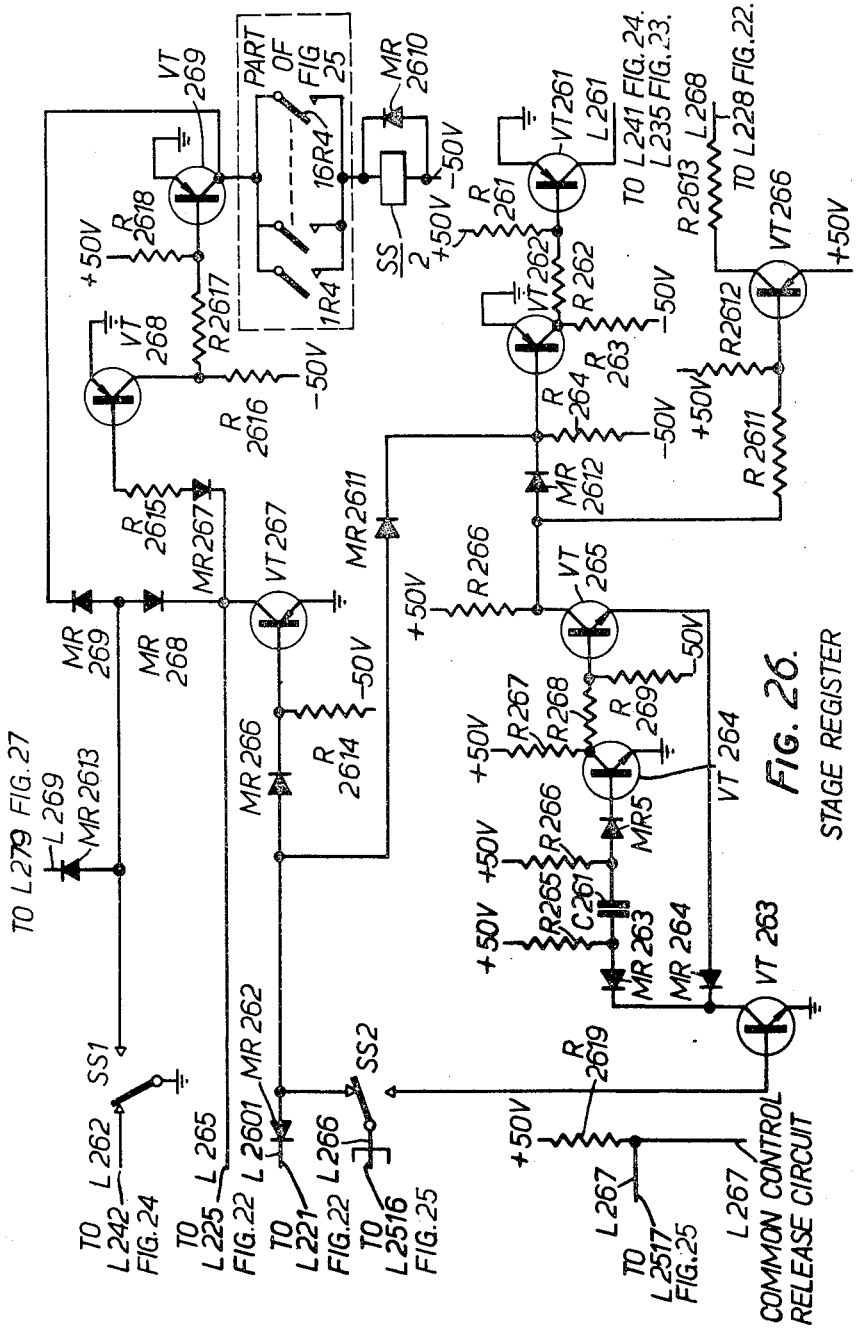

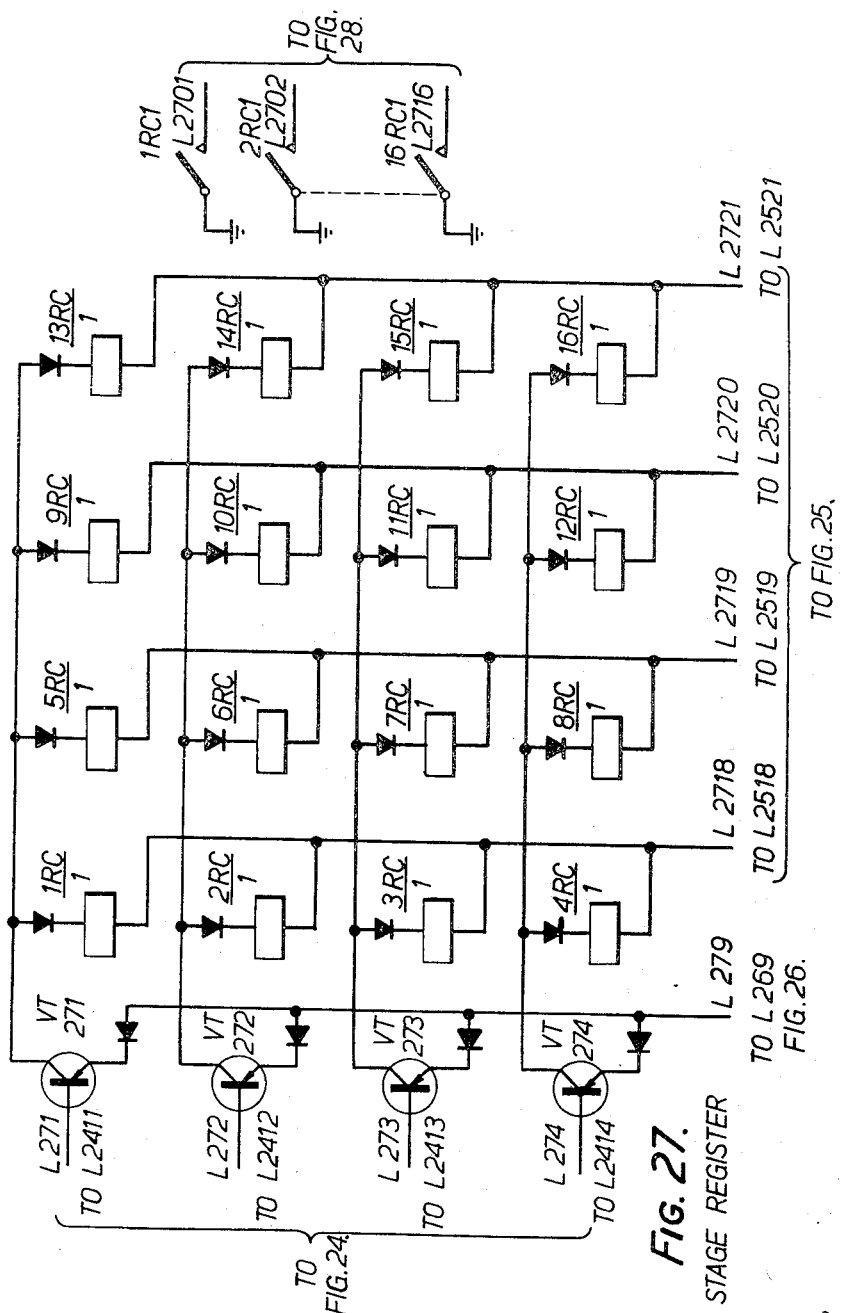
FIG. 27. STAGE REGISTER
Donald F. Rigby
INVENTOR

Dec. 16, 1969   D. F. RIGBY   3,484,559
INTERSTAGE SIGNALLING SYSTEM USING DISCRETE CURRENTS OR VOLTAGES.
Filed July 28, 1966   29 Sheets-Sheet 26
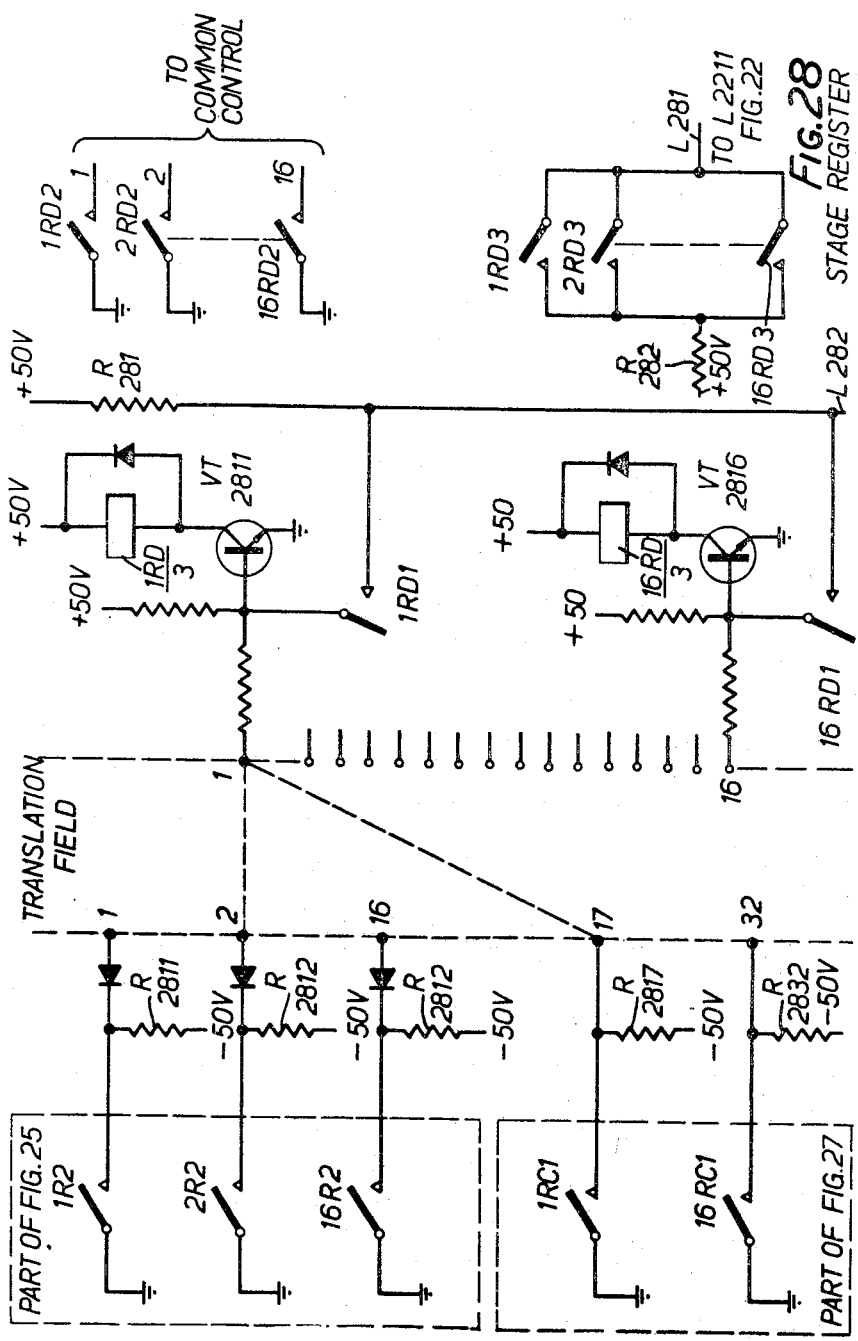
DONALD F. RIGBY
INVENTOR
BY Hall & Wright
ATTORNEY

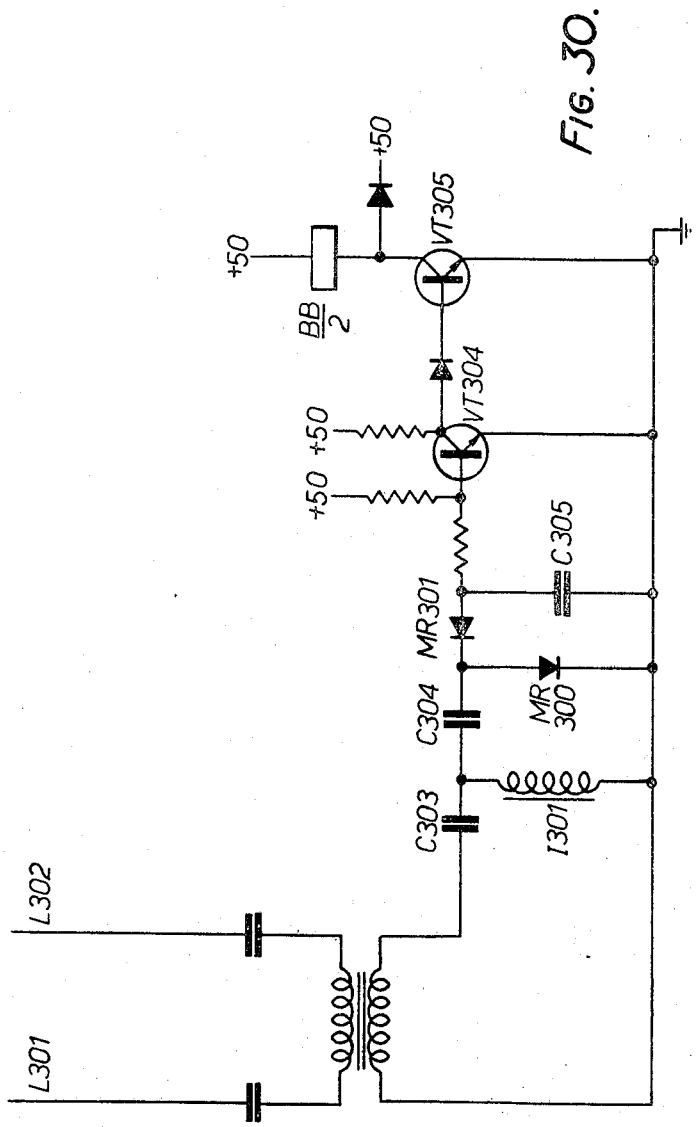

Dec. 16, 1969    D. F. RIGBY    3,484,559
INTERSTAGE SIGNALLING SYSTEM USING DISCRETE CURRENTS OR VOLTAGES
Filed July 28, 1966    29 Sheets-Sheet 28
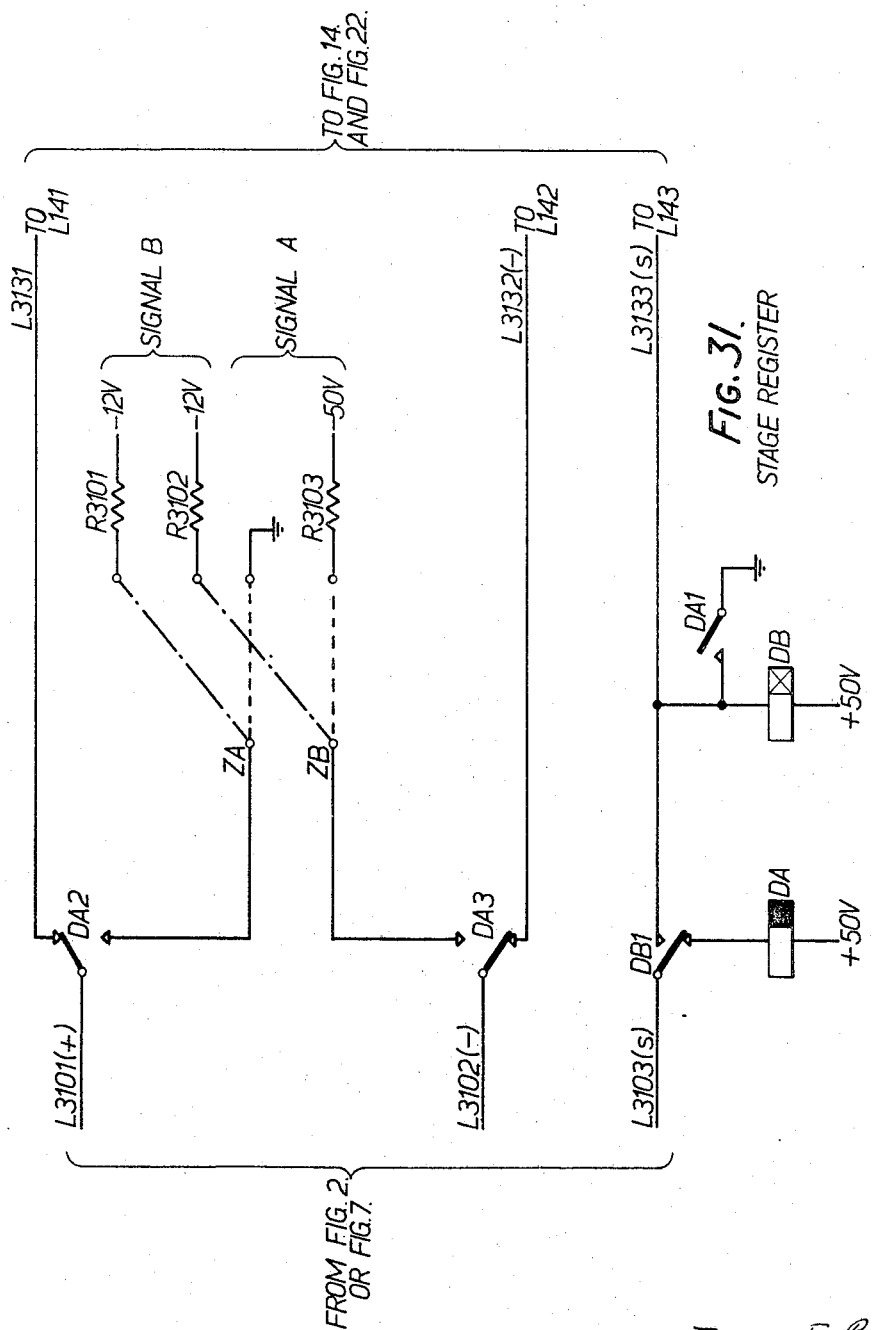
DONALD F. RIGBY
INVENTOR
BY
ATTORNEY

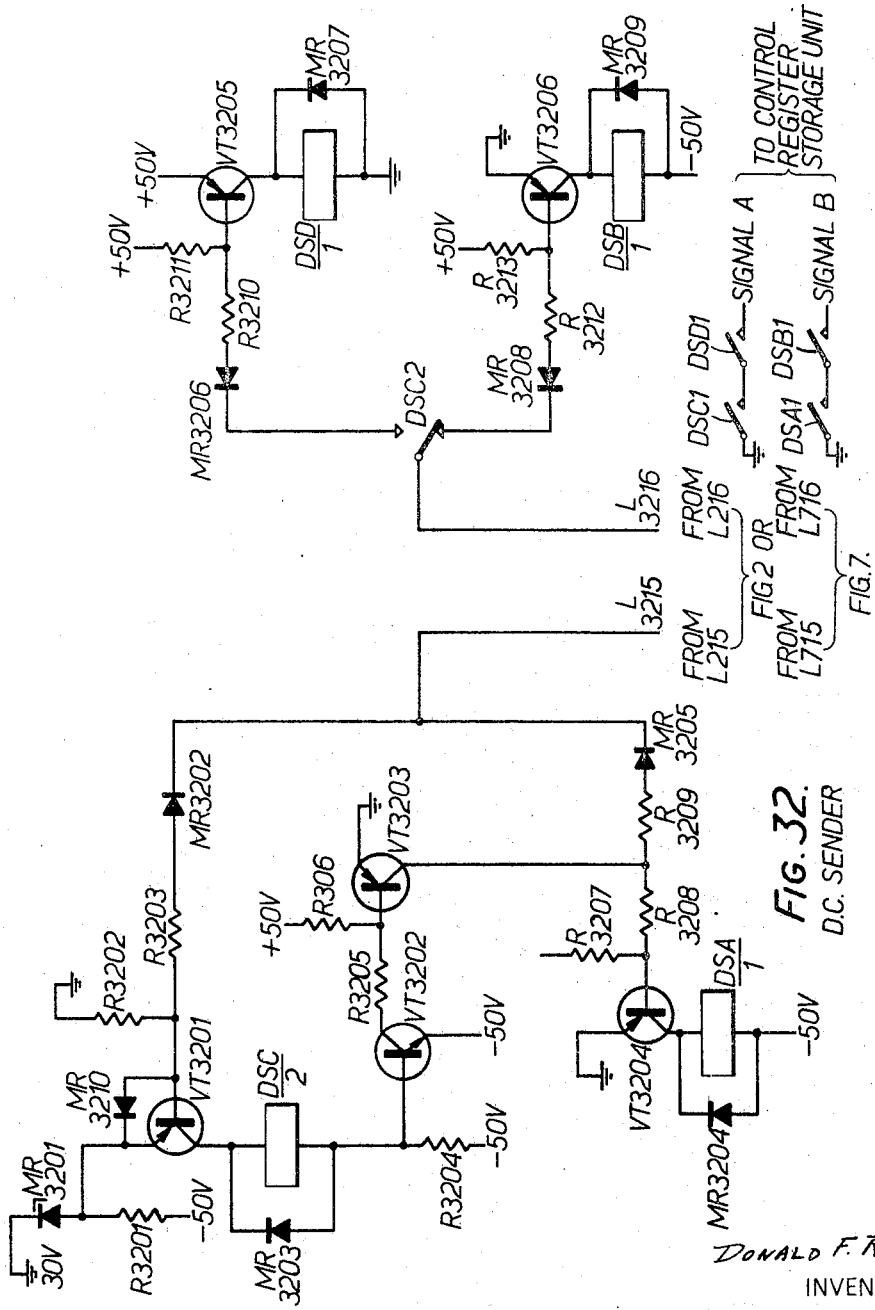

United States Patent Office 3,484,559
Patented Dec. 16, 1969

3,484,559
INTERSTAGE SIGNALLING SYSTEM USING DISCRETE CURRENTS OR VOLTAGES
Donald Frank Rigby, Orpington, Kent, England, assignor to Her Majesty's Postmaster General, London, England
Filed July 28, 1966, Ser. No. 568,523
Claims priority, application Great Britain, July 29, 1965, 32,557/65; Mar. 24, 1966, 13,101/66
Int. Cl. H04m 3/00, 1/26
U.S. Cl. 179—18
6 Claims

ABSTRACT OF THE DISCLOSURE

Automatic telephone exchange operating on the step-by-step principle in which signalling between stages is effected by sending combinations of currents or voltages over the speech paths between the stages. Transmission of the currents or voltages is initiated by a "Proceed to send" signal sent by a stage and is terminated by a "Digit acknowledge" signal. A combination of currents or voltages is examined by a stage by comparing each current or voltage with a set of standard reference currents or voltages to identify the combination.

BACKGROUND OF INVENTION

This invention relates to signalling transmission systems and more particularly to signalling systems for use in telecommunication systems in which information is required to be passed rapidly over transmission paths which may be part of an electronic telephone switching system.

In electronic telephone exchange systems, it is well known that the rapidity with which a connection can be set up makes it possible for common apparatus to be provided on the basis of setting up one connection only at a time. In order to do this, digital information in the form of loop/disconnect dial pulses or other suitable form received from a calling line, is first stored in the exchange. The information is then re-transmitted over the exchange switching system in the same or a different form at a speed comparable with the speed of operation of the system.

SUMMARY OF THE INVENTION

According to the present invention a system comprises in combination a transmitter linker to a receiver by a transmission path having at least two conductors, the transmitter including conversion means for converting each different item of information to be sent by the transmitter to the receiver into a unique combination of a number of discrete currents or voltages, the number of discrete currents or voltages in the combination being not greater than the number of conductors, and causing each current of the combination to flow through or each voltage of the combination to be applied to a different one of the conductors, and in which the receiver comprises comparison means for comparing the currents flowing through or the voltages applied to the conductors with a set of standard reference currents or voltages to identify the combination, a circuit for transmitting a first signal over the transmission path to the transmitter when a combination of currents or voltages are to be made to flow through or be applied to the conductors, and a circuit for transmitting a second signal over the transmission path to the transmitter when the receiver has identified a combination of currents or voltages and the latter is to cease flowing or to be removed from the conductors.

The transmission of the currents or voltages from the transmitter may be dependent upon the reception at the transmitter of a control signal sent from the receiver to the transmitter; no transmission taking place until that control signal is received. The transmitter may form part of control equipment in a telephone exchange which receives information concerning a wanted subscriber and which retransmits that information to other apparatus to set up the required connection. In this case, the first signal may be a voltage or current which initiates the transmission of the combination of currents or voltages. The control signal may be sent in the face of the combination of currents or voltages. In addition, the second signal may be a current or voltage sent back to the transmitter after the receiver has received a particular combination of currents or voltages. Such a second signal constitutes an acknowledgement signal and may also be sent in the face of the combination of currents or voltages being transmitted by the transmitter.

The number of leads in the transmission path and the number of discrete currents or voltages will depend upon the number of different signals. For example, a transmission path having two conductors used with four different currents or voltages provides sixteen different combinations of one current or voltage applied to each conductor. Three conductors and the same number of values provide sixty-four different combinations. Two conductors and five different currents or voltages provide twenty-five different combinations, and so on.

The different currents or voltages can also be combined by taking two or more at a time to provide further different currents or voltages thereby increasing the total number of different combinations. It will, of course, be understood that an equal number of reference currents or voltages will be provided in the receiver.

In one embodiment of the invention suitable for use in a step-by-step telephone switching system for example, that described in U.S. Patent No. 3,390,236 in the name of John Albert Lawrence, filed July 26, 1965, digital information received from a calling subscriber is first stored in a control register which then applies to a common translator for a translation of at least some of the stored digits. The translated digits are also stored in the control register which releases them and any other stored digits not involved in the translation sequentially to the transmitter for transmission to receivers in one or more stage register to effect the setting-up of a desired connection.

The present invention also provides a step-by-step switching system having a number of switching stages at least one of which includes a receiver for receiving at least two digits from the transmitter, a translator for translating the received digits into appropriate routing instructions and control means for setting the switching of the stage according to the routing instructions.

The receiver comprises a circuit for receiving the digits signalled to it, and for storing each such digit until translation has been effected. The receiver initiates the transmission to it of each digit by sending, first, a "Proceed-to-send" signal, and then, after reception of a received digit signal, a "digit acknowledge" signal. The stage may transmit the signals just mentioned in the face of the digit signals it is receiving. When a stage has received all of the digits required to set up the stage, translation of the received digits takes place followed by the setting of the switches of the stage to make connection to the next stage designated by the received digits, and the subsequent release of the receiver in this stage.

The receiver includes means for identifying the received digit signals and where the latter comprise voltage or current signals sent over a transmission path to the stage, the identifying means comprising a comparison circuit for comparing each received signal with a set of standard reference currents or voltages. The transmission path has a number of conductors each of which carries one of the voltages or currents of the combination of voltages or currents representing the digits.

A further feature of the switching system is the provision, in a stage, of circuitry for transmitting information from the stage identifying the nature of the latter. For example, a stage requiring two or other number of digits to operate it indicates this fact to the control register by means of a signal. A stage which is a P.B.X final stage signals the fact to the control register by means of a different signal. The control register is, of course, equipment with appropriate means for responding to the signals sent to it from the stages. These signals are the first to be sent from a stage and are sent as soon as the stage is seized and before the control register sends controlling digits to the stage.

DESCRIPTION OF THE PREFERRED EMBODIMENT

The preferred embodiment of the invention is to be described in its application to a telephone switching system as described in U.S. Patent specification No. 3,390,236 in the name of John Albert Lawrence filed July 26, 1965.

Figure 1:
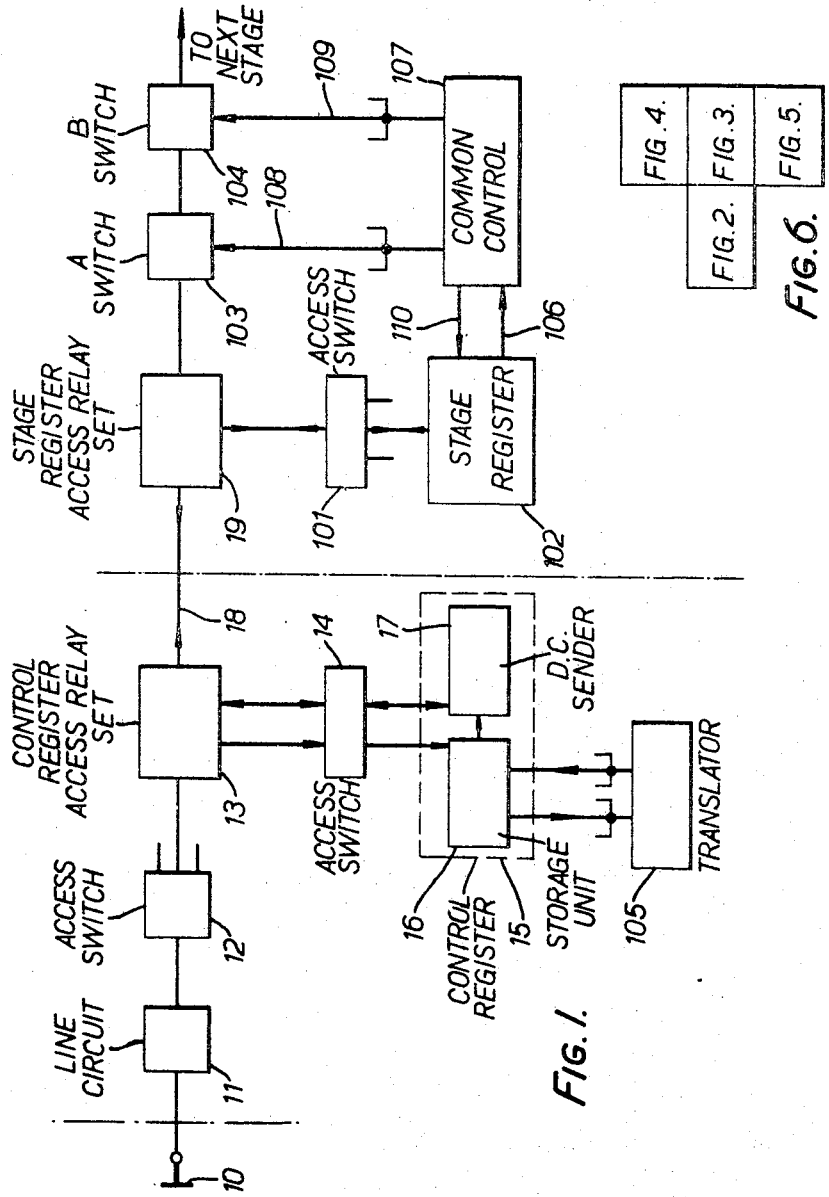
FIG. 1 is a block schematic diagram of part of the exchange switching system.

In FIG. 1 a calling line 10 is connected via line circuit 11 to access switch 12 which operates to select a free control register access relay set 13, which in turn, via access switch 14, seizes a control register 15, comprising a storage unit 16, and D.C. sender 17. The control register access relay set 13 is also connected by an individual speech trunk 18 comprising positive, negative and signal leads, to a stage register access relay set 19, and this, via access switch 101 seizes a free stage register 102. Stage register access relay set 19 is also connected to A switch 103 and B switch 104 connected in series, these switches forming the speech path switches of the first switching stage, the output of the B switch 104 giving access to the next switching stage. When the calling line 10 has been connected through to a control register 15, information concerning the connection to be set up is stored in the storage unit 16 of the control register 15. The information may, where the calling line is a calling subscriber, be in the form of code digits followed by numerical digits. As soon as sufficient digital information has been stored to designate the required destination, i.e. the code digits, the control register 15, by means of its storage unit 16, applies to the translator 105 for a translation to route the connection.

The translation digits from the translator 105 are passed back into the storage unit 16, where they are stored. Storage unit 16 then passes the first digit of its stored information into the D.C. sender 17, where it is stored, resulting in the D.C. sender 17 seizing, via access switch 14, the relay set 13, which in turn sends a D.C. signal on the signal lead of the speech trunk 18, to the first switching stage to seize stage register access relay set 19 which via access switch 101 seizes a free stage register 102. Upon being seized, stage register 102 returns a D.C. signal termed "Proceed-to-send" signal, back over the positive and negative leads of speech trunk 18 to the D.C. sender 17 in control register 15. The digit stored in D.C. sender 17 is then sent over the speech trunk 18 in the form of a potential on the positive lead and a potential on the negative lead, and is stored in the stage register 102 of the first switching stage, to produce on the output 106, a signal characteristic of the digit. This signal on output 106 is passed to the common control apparatus 107 of the first switching stage, which then controls, via its output 108, the operation of the A switch 103 to make connection to the B switch 104, and via its output 109, the operation of the B switch 104 to make connection to the second switching stage. When this has been done, the common control 107 via its output 110 releases the storage in the stage register 102, which in turn, over the speech trunk 18, releases the storage in D.C. sender 17. The storage unit 16 of control register 15 will then pass another digit into D.C. sender 17 where it will be stored and transmitted in a similar manner, except that it will pass straight through the stage register access relay set 19 and the A and B switches of the first switching stage, to the second switching stage, where it will be stored in a stage register and bring about the switching of A and B switches of the second stage in a manner similar to that described for the first stage.

Instead of each stage being controlled by a single digit only from the D.C. sender 17, it can be arranged if necessary, that a stage register will store a number of digits, before causing the common control 107 to operate the A and B switches.

Figure 2:
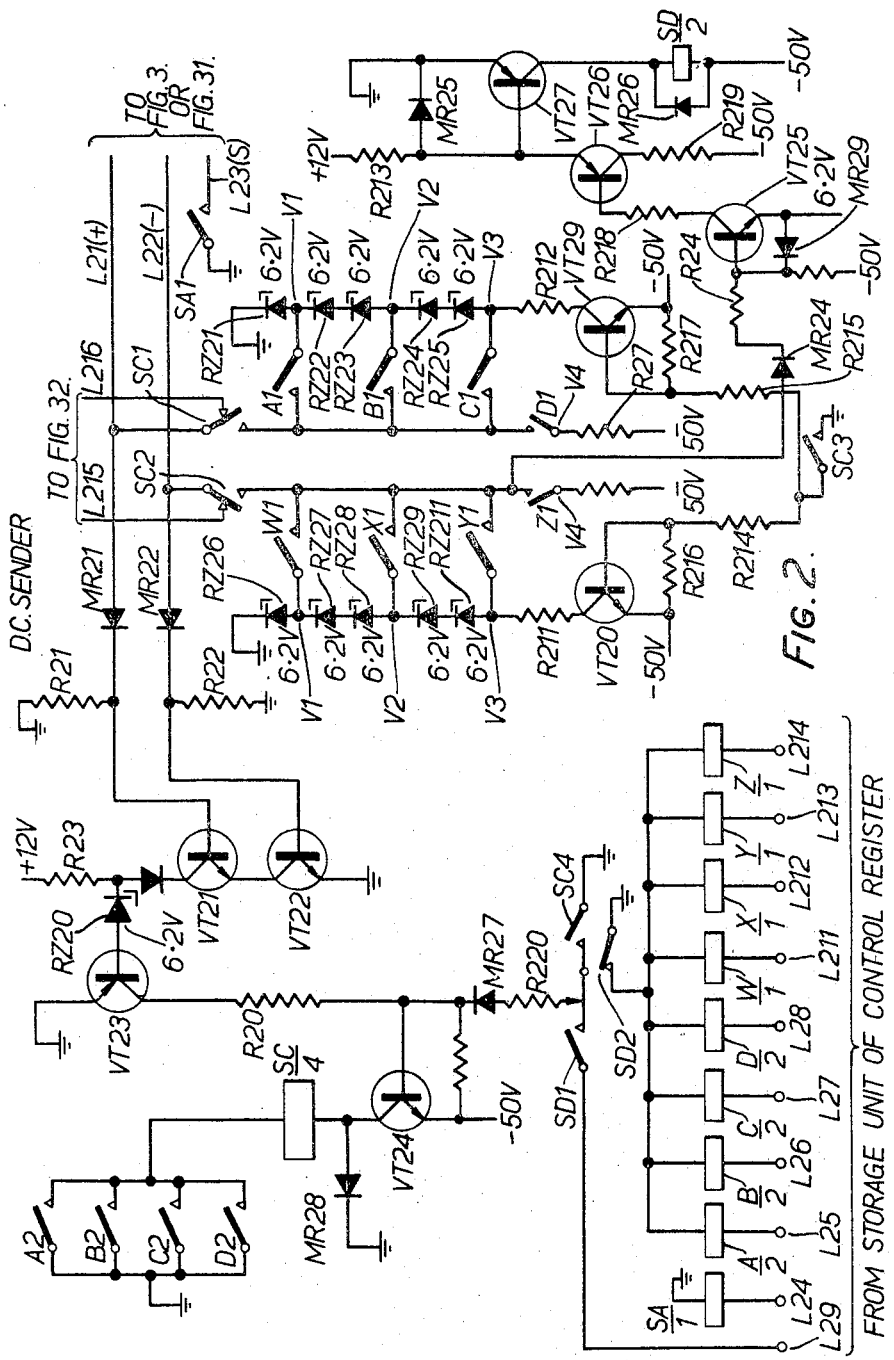
FIGS. 2–5 when assembled as shown in FIG. 6 form a circuit diagram of a first embodiment, FIGS. 7–12 when assembled as shown in FIG. 13 form a circuit diagram of a second embodiment, FIGS. 2, 14–20, 31 and 32 when assembled as shown in FIG. 21, form a circuit diagram of a third embodiment, FIGS. 7, 8, 22–25, 25a′–28, 31 and 32 when assembled as shown in FIG. 29, form a circuit diagram of a fourth embodiment, and, FIG. 30 is a circuit diagram of an alternative arrangement of part of the first, second, third and fourth embodiments.

The first embodiment is concerned with the passing of information from the D.C. sender 17 of the control register 15, over the speech trunk 18 to the stage register 102 and will now be described in greater detail with reference to FIGS. 2–5, assembled as shown in FIG. 6, it being understood that the intermediate access equipment as shown in FIG. 1, and which may take any of a number of well known forms is not included. FIG. 2 is a composite figure and depicts circuitry employed in both the first and a third embodiment described later. When the circuitry is employed in the first embodiment, the leads L215 and L216 are not used.

Figure 3:
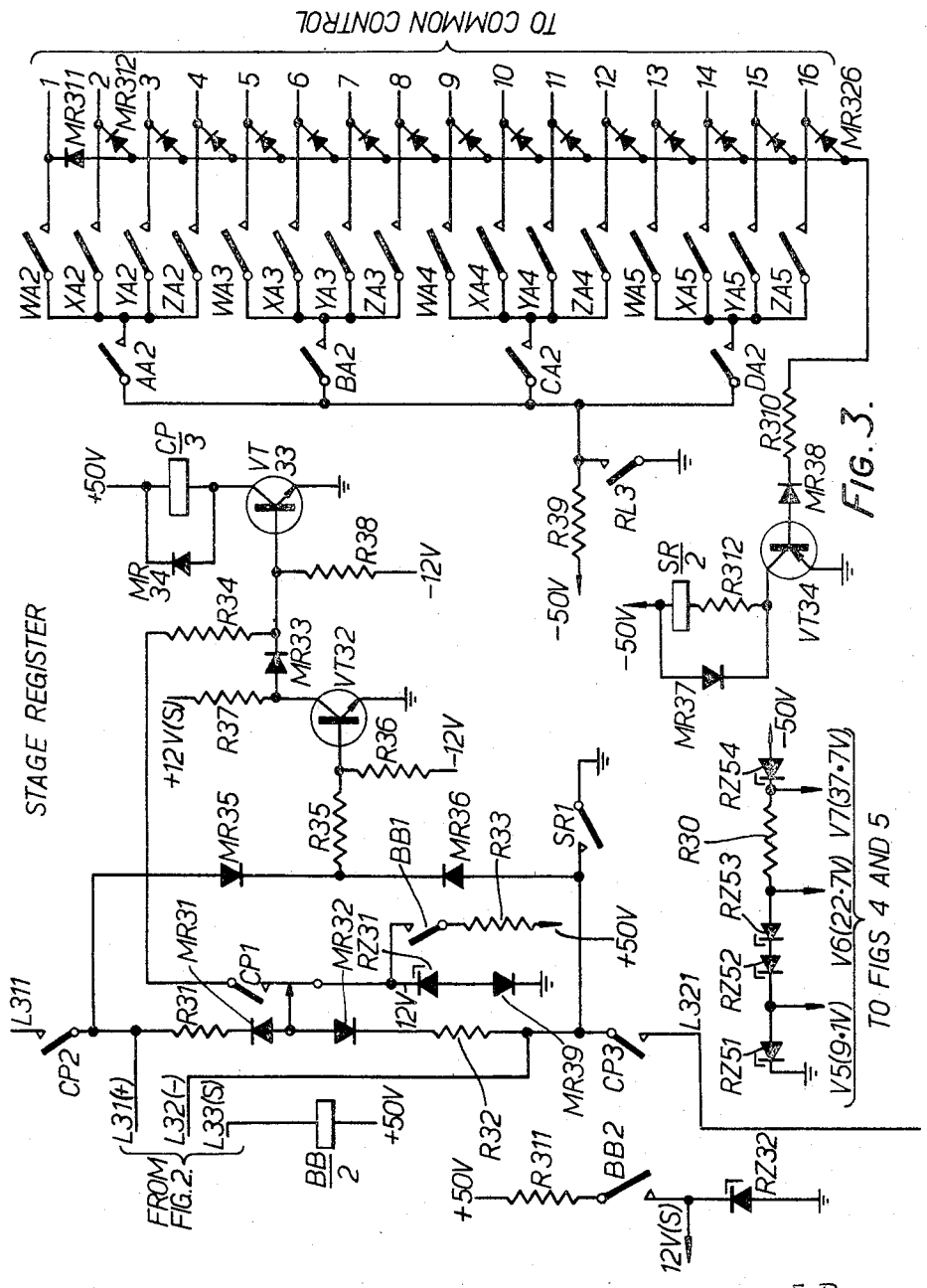

As soon as the translation has been stored in storage unit 16 of the control register 15, FIG. 1, the storage unit 16 seizes the D.C. sender, FIG. 2 by operating relay SA over lead L24 and at the same time transmits the first digit which is stored in the D.C. sender, on the basis of a 1 out of 4 signal in each of the sets of leads L25–28 and L211–214, each digit being characterised by the combination of one relay operated in each of the groups of relays A–D and W–Z. The combination of 1 out of 4 twice, allows 16 discrete signals which for example could be made up of the ten digits 0–9 and six other signals as required. The 16 signals could be characterised as follows:

Signal:
    1 digit 1 relays A and W
    2 digit 2 relays A and X
    3 digit 3 relays A and Y
    4 digit 4 relays A and Z
    5 digit 5 relays B and W
    6 digit 6 relays B and X
    7 digit 7 relays B and Y
    8 digit 8 relays B and Z
    9 digit 9 relays C and W
   10 digit 0 relays C and X Signals as required:
   11 relays C and Y
   12 relays C and Z
   13 relays D and W
   14 relays D and X
   15 relays D and Y
   16 relays D and Z Contact SA1 operated connects earth to signal lead L23 of speech trunk 18 to the stage register, FIG. 3, where on lead L33 it operates relay BB. Contact BB1 operated connects +50 v. via R33 to Zener diode RZ31 and rectifier MR39 to earth. 12 v. from RZ31 is connected to the positive lead L31 via MR31 and R31, and to the negative lead L32 via MR32 and R32, this constituting the "Proceed-to-send" signal. 12 v. from RZ31 is also connected via MR31, R31 and MR35, and via MR32, R32 and MR36 to R35 and R36, and turns on transistor VT32 which prevents the operation of relay CP by preventing transistor VT33 turning on when the 12 v. (S) i.e. switched supply, is connected to R37. The 12 v. (S) switched supply is produced by contact BB2 operated, connecting 50 v. to R311 and Zener diode RZ32. In the D.C. sender, FIG. 2, the 12 v. "Proceed-to-send" signal is received on leads L21 and L22. On lead L21 via MR21 and R21 it turns on transistor VT21, and on lead L22 via MR22 and R22 it turns on transistor VT22. This allows transistors VT23 and VT24 to turn on and so cause relay SC to operate, thus proving the continuity of the transmission leads. Relay SC holds via MR27, R220, contact SD1 unoperated, operated contact SC4 to earth.

Contacts SC1 and SC2 operated connect leads L21 and L22 respectively, to the first contacts of each of the relays A–D and W–Z. As already stated, one relay in each group is operated in accordance with the digit transmitted from the storage unit 16 of the control register 15, FIG. 1, and so a signal representing the stored digit is passed to the stage register, FIG. 3, in the form of a potential value connected to the positive lead L21, and a potential value connected to the negative lead L22. These signals are received on leads L31 and L32 respectively, in the stage register FIG. 3. Due to the current limiting resistor R33 the leads L31 and L32 fall to a potential below earth and transistor VT32 turns off, allowing transistor VT33 to turn on and operate relay CP, which locks via R34 to contact CP1 operated. Contact CP1 operated disconnects the 12 v. "Proceed-to-send" signal from leads L31 and L32. Contact CP2 operated connects lead L311 to lead L41, FIG. 4, connected to the detector circuits VT41–44 which receive the signals sent over the positive lead L21 of the D.C. sender FIG. 2, and contact CP3 operated connects in like manner, lead L321 to lead L51, FIG. 5, connected to the detector circuits VT51–54, which receive the signals sent over the negative lead L22 of the D.C. sender, FIG. 2.

Figure 4:
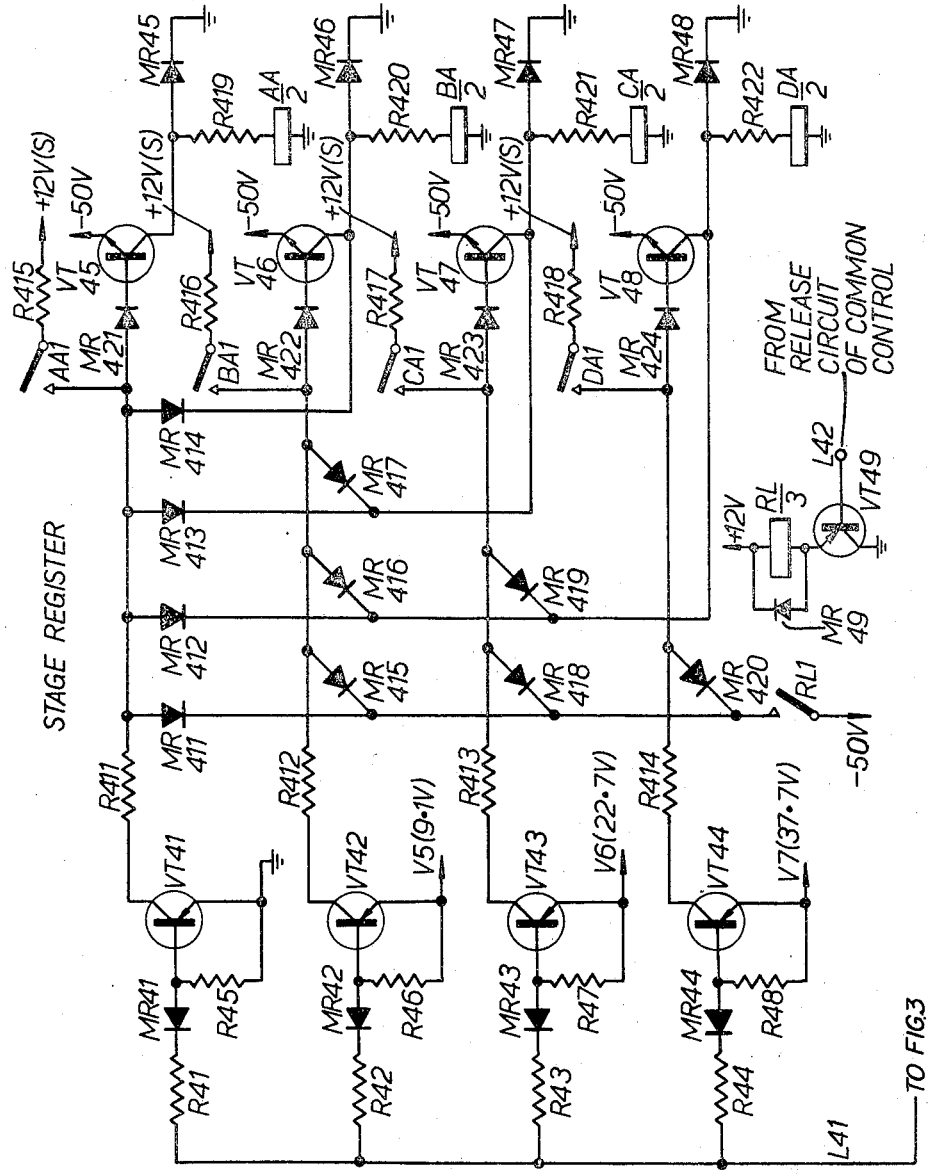
Figure 5:
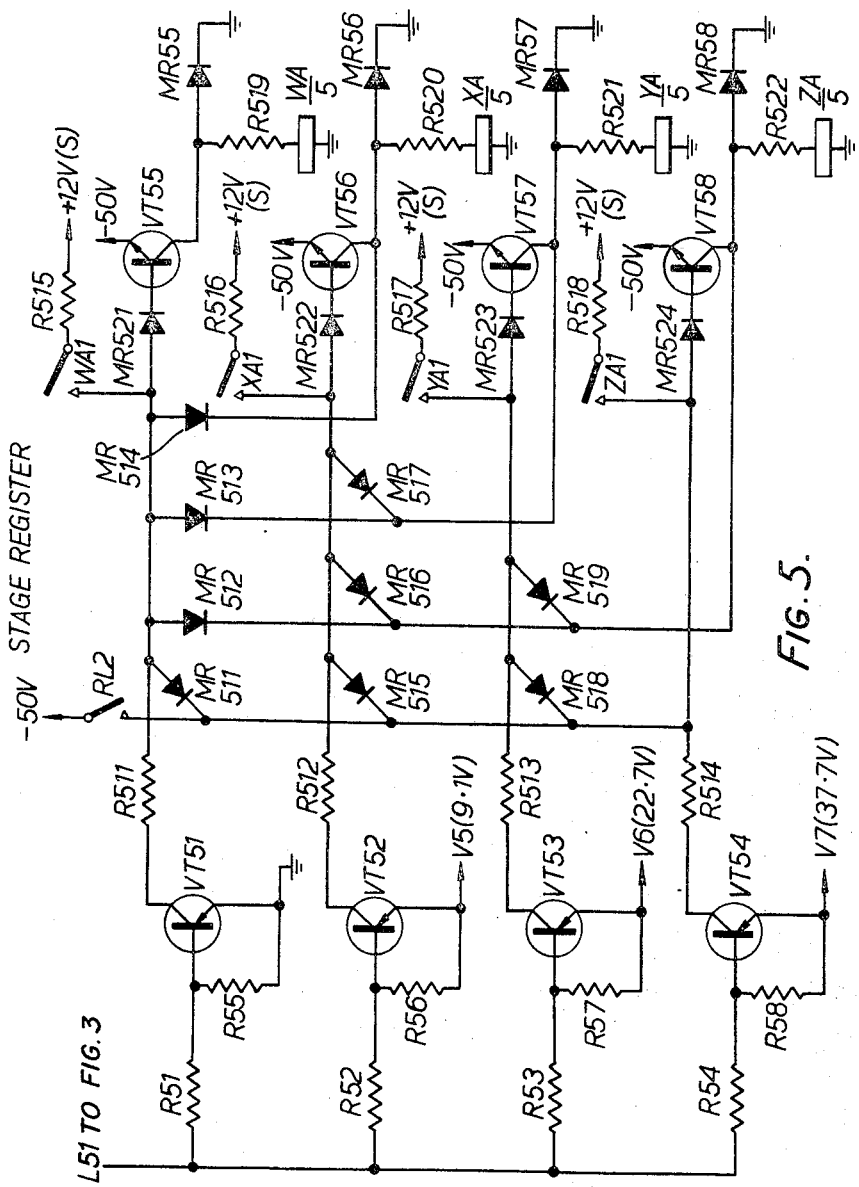

The operation of the detector circuit responsive to signals sent on the positive lead and shown in FIG. 4, is similar to that of the detector circuit responsive to signals sent on the negative lead, and shown in FIG. 5, and in this description, the operation of the detector circuits will be described in relation to the positive lead and FIG. 4 only.

In the D.C. sender, FIG. 2, four different signals can be sent via contact SC1 operated, connected to the positive lead L21. These consist of four discrete potential values obtained from points on the chain of Zener diodes RZ21–25 and from R27. The four send potentials are V1 from the point between RZ21 and RZ22, V2 from between RZ23 and RZ24, V3 from between RZ25 and R212 and V4 from R27.

V1 is connected when relay A is operated, V2 when relay B is operated, V3 when relay C is operated and V4 when relay D is operated.

The operation in FIG. 4 of these signals sent on the positive lead L21, FIG. 2 via lead L31, FIG. 3, operated contact CP2, lead L311, to lead L41, FIG. 4, is as follows:

Send potential V1 turns on transistor VT41, the emitter of which is connected to earth.

Send potential V2 turns on transistors VT41 and VT42, the emitter of VT42 connected to V5.

Send potential V3 turns on transistors VT41, VT42 and VT43, the emitter of VT43 connected to V6.

Send potential V4 turns on transistors VT41, VT42, VT43 and VT44, the emitter of VT44 connected to V7.

Potentials V5, V6 and V7 are derived from Zener diode chains RZ51–RZ54, FIG. 3.

Transistor—
  VT41 turns on transistor VT45
  VT42 turns on transistor VT46
  VT43 turns on transistor VT47
  VT44 turns on transistor VT48

But, due to the diode matrix 411–420, the highest numbered transistors in the series VT45–48, inhibits all lower numbered transistors and hence for any one of the send signal potentials V1–V4, one only of the transistors VT45–48 will remain turned on. The turned-on transistor operates its associated relay as follows:

Transistor—
  VT45 operates relay AA
  VT46 operates relay BA
  VT47 operates relay CA
  VT48 operates relay DA It will be appreciated that the operating time of a relay is so much greater than that of a transistor, that although more than one transistor in the series VT45–48 may be initially turned on, those, with the exception of the highest numbered, will be inhibited and turned off, before For example, if transistors VT41, VT42 and VT43 are turned on as a result of signal V3 being received, VT45, VT46 and VT47 will be turned on, but VT47 inhibits VT46 via MR417 and VT45 via MR413, so that only VT47 remains turned on, and only the associated relay CA will be operated.

For any digit signalled from D.C. sender, FIG. 2, it should be remembered that a potential is connected to each of the two leads L21 and L22. The signal on lead L21 is received by the detector of FIG. 4 as already described, while the signal on lead L22 is received in like manner by the detector of FIG. 5. Thus, as a result of sending a digit from D.C. sender, FIG. 2, one of the relays AA–DA, FIG. 4 is operated, and one of the relays WA–ZA, FIG. 5 is operated. The combination of those two operated relays, characterises the sent digit, and in FIG. 3, the series connected contacts of the two operated relays connects −50 v. via R39 to mark the individual lead representative of the received digit. For example, if the digit 9 is sent from D.C. sender, FIG. 2, this results in relays CA and WA being operated in the stage register, FIG. 3, so that −50 v. via R39, contact CA2 operated and contact WA4 operated, marks output lead 9 of the output leads 1–16 to the common control. A marking signal on any one of the output leads 1–16 via the associated diode of diodes MR311–326, and via R310 and MR38, turns on transistor VT34, which in turn operates relay SR, causing a "Signal detected" signal to be returned to the D.C. sender FIG. 2. Contacts SR1 operated applies the signal as an earth to the negative lead L32, back into the D.C. sender FIG. 2, on lead L22 and via contact SC2 operated, MR24, R24 and turns on transistor VT25, which causes transistors VT26 and VT27 to turn on and thereby operate relay SD. Contact SD1 operated, first applies earth from contact SC4 operated to lead L29 and then releases relay SC. Contact SD2 operated, releases the operated relays in the groups A–D and W–Z. Contact SC2 released, causes relay SD to release. The earth applied to lead L29 into the storage unit of the control register, is a signal to the storage unit that the D.C. sender is ready to receive another digit. The storage unit removes the condition on lead L24 to release relay SA. Contact SA1 released, removes the earth from lead L23 to release relay BB on lead L33, FIG. 3. Contact BB1 released disconnects hold circuit of relay CP. Contact BB2 released breaks circuit of RZ32 and removes 12 v. (S) supply. Relay CP and any of the operated relays in the groups AA–DA and WA–ZA will release.

The connection is now held by the calling subscriber via a condition applied in the control register access relay switch.

The "signal detected" signal sent back from stage register FIG. 3 to the D.C. sender, FIG. 2, is not restricted to earth on the negative lead L32 as described, but can take the form of earth on the positive lead L31, or earth on both of the leads L31 and L32, each of the conditions causing, in the D.C. sender FIG. 2, the operation as described, and another operation signifying additional information. Additional circuitry required in FIG. 2 for the reception of signals sent back on lead L21 and on both L21 and L22 is not shown, but will be apparent to those skilled in the art.

In the stage register, a release signal is received on lead L42, FIG. 4, from the common control when it has completed its operation. This signal on lead L42 turns on transistor VT49 and operates relay RL. Contact RL1 operated, FIG. 4, connects −50 v. to the detector circuit of FIG. 4, and contact RL2 operated, FIG. 5, similarly connects −50 v. to the detector circuit of FIG. 5 in order to guard the detectors against false signals due to switching in the stage.

Relay SR releases when transistor VT34 is turned-off and the release of operated relays in the groups AA–DA and WA–ZA and contact SR1 released removes "signal detected" signal earth from lead L32, FIG. 3.

When another digit has been transferred from the storage unit into the D.C. sender, FIG. 2, the D.C. sender will await a "Proceed-to-send" signal on both leads L21 and L22 as already described, this signal being returned from a subsequent stage register.

A further embodiment in which the digit signals are discrete current values will now be explained in conjunction with FIGS. 7–12, arranged as in FIG. 13, which show a D.C. sender connected to a stage register as in FIG. 1 and in which:

FIGS. 7 and 8 depict the D.C. sender, and
FIGS. 9–12 depict the stage register.

FIG. 7 is a composite figure and depicts circuitry employed in both the second and a fourth embodiment described later. When the circuitry is employed in the second embodiment, the leads L715 and L716 are not used.

As soon as the translation has been stored in storage unit 16 of control register 15, FIG. 1, the storage unit seizes the D.C. sender, FIGS. 7 and 8, and operates relay SA over lead L815 and at the same time transmits the first digit which is stored in the D.C. sender on the basis of a 1 out of 4 code in each set of leads L81–84 and L811–814, each digit being characterised by the combination of one relay operated in each group of relays A–D connected to leads L81–84 and relays W–Z connected to leads L811–814. The combination of 1 out of 4 twice allows 16 discrete signals which, for example, can be made up of the ten digits 0–9 and six other signals as required. The 16 signals could be characterised as follows:

Signal:
1 digit 1 relays A and W
2 digit 2 relays A and X
3 digit 3 relays A and Y
4 digit 4 relays A and Z
5 digit 5 relays B and W
6 digit 6 relays B and X
7 digit 7 relays B and Y
8 digit 8 relays B and Z
9 digit 9 relays C and W
10 digit 0 relays C and X
Signals as required:
11 relays C and Y
12 relays C and Z
13 relays D and W
14 relays D and X
15 relays D and Y
16 relays D and Z Contact SA1, FIG. 7, connects earth to signal lead L73 connected to lead L93, FIG. 9, to operate relay BB. Operated contact BB1 connects +50 v. on resistor R92 via normal contact CP1, to resistor R91 and via diode MR91 and normal contact CP2 to the positive lead L91, and via diode MR92 and normal contact CP3, to the negative lead L92, this condition on leads L91 and L92 constituting the "Proceed-to-send" signal. Lead L91 is connected to lead L71, FIG. 7, and the signal on this lead via normal contact SC1, diode MR73 and resistor R78 turns on transistor VT73. Lead L92, FIG. 9, is connected to lead L72, FIG. 7, and the signal on this lead via normal contact SC2, diode MR74 and resistor R79 turns on transistor VT74. Transistors VT73 and VT74 turned-on, cause transistor VT72 to turn on and so cause transistor VT71 to turn on and operate relay SC to lead L79 connected to lead L89, FIG. 8, which has earth connected by an operated contact of one of the relays A–D due to storage of received information. Operated contacts SC1 and SC2, FIG. 7, connect leads L71 and L72 to leads L75 and L76 respectively. Operated contact SC3 connects earth via normal contacts SD1 and resistor R71 to hold transistor VT71 turned on, and also connects earth via diode MR79 to lead L77 connected to lead L88, FIG. 8. The earth on lead L87 is connected via resistor R89 to bias Zener diode RZ82. This clamps the bases of the constant current generator transistors VT81 and VT82 to a voltage determined by −50 v. minus the voltage of Zener diode RZ82. Resistance is connected in the emitter circuits of transistors VT81 and VT82 depending on the relay contacts in the sets of contacts A1–D1 and W1–Z1 that are operated and this resistance determines the emitter current and hence, very nearly, the collector current. Contacts A1–D1 are associated with resistors R81–84 and contacts W1–Z1 with resistors R85–88, respectively. Typical values of current for the four signals determined by the four contacts A1–D1 and W1–Z1 are:

Signal: | Ma.
--- | ---
1st | 1.10
2nd | 2.25
3rd | 4.70
4th | 9.40

The signal currents from the collectors of transistors VT81 and VT82 flow via leads L85 and L86 connected to leads L75 and L76, FIG. 7, respectively, via operated contacts SC1 and SC2 to leads L71 and L72 connected to the stage register leads L91 and L92, FIG. 9, which, via normal contacts CP2 and CP3, diodes MR91 and MR92 respectively, common resistor R91, normal contact CP1 operated contact BB1 and resistor R92 are connected to +50 v. Resistor R91 is of such a value that the lowest value of signal current is sufficient to swing the potential of leads L91 and L92 negative going and cause transistors VT91 and VT92 and thus VT93 to turn on and operate relay CP which holds via operated contact CP1. Operated contact CP2 extends lead L91 to lead L95 connected to lead L105, FIG. 10, and operated contact CP3 connects lead L92 to lead L99 connected to lead L119, FIG. 11. Current on lead L105, FIG. 10, turns on transistors VT101 and VT102, to operate relay P which locks via operated contact P2 to earth on lead L107 connected to lead L97 and operated contact BB2, FIG. 9. Operated contact P3, FIG. 10, connects the emitter resistor R1004 of the register constant current generator transistor VT105 to +50 v. Positive current flows from transistor VT105 to meet the incoming negative current via lead L105. If the signal current is of the lowest magnitude, the current from transistor VT105 will tend to drive lead L105 positive and diode MR101 to conduct thus turning off transistors VT101 and VT102. If, however, a higher magnitude of current is received from lead L105, this lead will remain negative and transistors VT101 and VT102 will remain turned on. Earth from transistor VT102 will then be extended via operated contact P1 to operate relay Q. According to the signal received, this procedure of the comparator circuit of transistors VT101 and VT102 will continue. Contacts P3, Q3, R3 and S3 each connect a resistor, R1004, 1005, 1006 and 1007 respectively, in the emitter circuit of the constant current generator transistor VT105, in order to determine the positive collector current, which is used as a reference on lead L105 with the incoming negative current signal.

Typical values of the four currents provided by contacts P3, Q3, R3 and S3 relative to the four signal current values stated for the D.C. sender are:

|     | Ma.   |
| --- | ----- |
| P3  | 1.35  |
| Q3  | 2.75  |
| R3  | 5.15  |
| S3  | 11.40 |

When the comparator circuit is balanced, i.e. VT101 and VT102 turned off, earth is not extended to the next relay. A pattern is thus established as follows:

1st signal relay P operated
2nd signal relays P and Q operated
3rd signal relays P, Q and R operated
4th signal relays P, Q, R and S operated If, say, relays P, Q and R are operated and the comparator circuits VT101 and VT102 are balanced, i.e. turned off, the disconnection by transistor VT102 of earth via diode MR107, turns off transistor VT103, thus turning on transistor VT104 and extending −50 v. to the inputs of resistors R1000–1003. The bases of transistors VT106 and VT107 will be shunted to earth via diode MR109 and operated contact Q2 and via diode MR1000 and operated contact R2 respectively. Thus transistor VT108 only will be turned on and extend earth to lead L103. Earth appears therefore on one of the leads L101–104 depending on the signal received. The relays P, Q, R and S are fast-acting relays, for example, reed relays.

Figure 10:
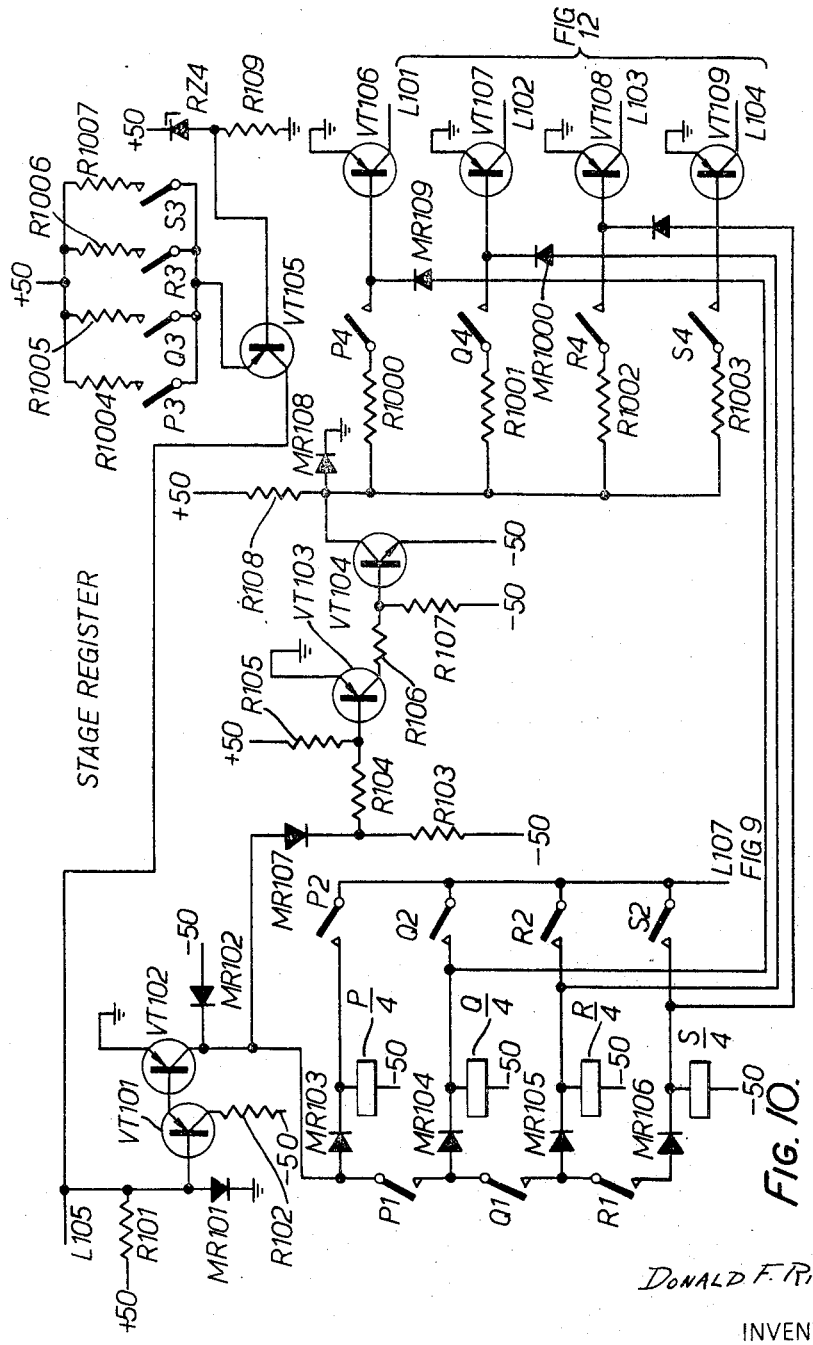

A similar operation occurs in FIG. 11 and an earth will be extended to one of the leads L115–118. Leads L101–104, FIG. 10, are connected to leads L121–124, FIG. 12, respectively, and leads L115–118, FIG. 11, are connected to leads L125–128, FIG. 12, respectively. Thus in FIG. 12 the two 1 out of 4 signals, one via one of the leads L125–128 and one via one of the leads L121–124 connected to transistors VT121–124, are gated together in the 16 relay matrix 1R–16R, resulting in one of the 16 relays being operated. When one of the relays of the set 1R–16R is operated, its first contact, i.e. 1R1–16R1, connects +50 v. via resistor R121 to lead L128 connected to lead L91, FIG. 9. Resistor R121, FIG. 12, is of such a value that the lead L91, FIG. 9 and hence lead L71, FIG. 7 goes positive, and via operated contact SC1, diode MR76 and resistor R72 turns on transistor VT75 and operates relay SD. Operated contact SD1 connects earth from operated contact SC3 to lead L78 connected to the control register, FIG. 1, to indicate that another digit can be prepared for transmission to the D.C. sender. This will result in release of the relays operated in the relays A–D and W–Z and also of relay SA in FIG. 8. Contact SA1 released, removes earth from lead L73, FIG. 7, to release relay BB, FIG. 9. Operated contact SD1, FIG. 7, also removes the locking circuit of relay SC which releases. Contact SC1 released, releases relay SD. Should the acknowledgment signal persist on lead L71, FIG. 7, after the release of relay SC, only transistor VT73 will try to turn on and a false "Proceed-to-send" signal will not be given as transistor VT74 is not turned on.

The connection is now held by the calling subscriber via a condition applied in the control register access relay switch.

The embodiment described above with reference to FIGS. 2–6 is intended for signalling to the switching stages of a telephone switching system where the signalling paths are short and consequently of relatively low D.C. resistance. On longer lines higher signalling potentials will be necessary. Alternatively, current signalling incorporating the principles described above with reference to FIGS. 7–13 could be used, the signaling current values being of the order of only several milliamps. Current signalling might be used to convey dialled signals from a subscriber's instrument to the exchange. The loop condition which constitutes the calling signal is broken to provide the necessary two signalling paths and the act of dialling inserts into the two lines resistances of a value appropriate to the digit to be sent. During dialling, the hold condition will be maintained from the exchange end of the subscriber's line.

The first and second embodiments are examples of signalling systems employing single digit operation of the stages. As has been explained above operation by two or more digits is possible and the following embodiments are examples of the two digit operation. Further, it is not necessary that the stages shall all be capable of operation by the same number of digits, a mixed arrangement might be adopted in which certain stages are operated by one number of digits and another stage or other stages by a different number of digits.

Figure 21:
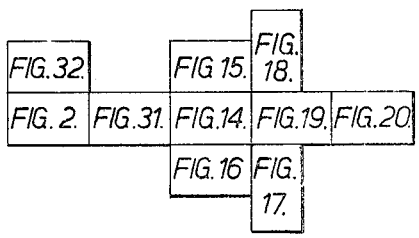

The third embodiment will now be described with reference to FIGS. 2, 14–20, 31 and 32 assembled as shown in FIG. 21, it being understood that the intermediate access equipment as shown in FIG. 1, and which may take any of a number of well known forms is not included.

As soon as the translation has been stored in storage unit 16 of the control register 15, FIG. 1, the storage unit 16 seizes the D.C. sender, FIG. 2 by operating relay SA over lead L24 and at the same time transmits the first digit which is stored in the D.C. sender, on the basis of a 1 out of 4 signal in each of the sets of leads L24–28 and L211–214, each digit being characterised by the combination of one relay operated in each of the groups of relays A–D and W–Z. The combination of 1 out of 4 twice, allows 16 discrete signals which for example could be made up of the ten digits 0–9 and six other signals as required. The 16 signals could be characterised as follows:

Signal:
    1 digit 1 relays A and W
    2 digit 2 relays A and X
    3 digit 3 relays A and Y
    4 digit 4 relays A and Z
    5 digit 5 relays B and W
    6 digit 6 relays B and X
    7 digit 7 relays B and Y
    8 digit 8 relays B and Z
    9 digit 9 relays C and W
   10 digit 0 relays C and X
Signals as required:
   11 relays C and Y
   12 relays C and Z
   13 relays D and W
   14 relays D and X
   15 relays D and Y
   16 relays D and Z Contact SA1 operated connects earth to signal lead L23 which is connected to lead L3103 of the stage register, FIG. 31, where via normal contact DB1, the earth operates relay DA. Operated contact DA1 provides an operate circuit for slow-to-operate relay DB of say 10–30 milliseconds slow operation. Operated contacts DA2 and DA3 apply the Signal Condition connected to terminals ZA and ZB to leads L3101 and L3102 respectively connected to leads L21, L22 respectively in the D.C. Sender, FIG. 2. The Signal Condition applicable to the particular stage is connected to terminals ZA, ZB. In FIG. 31, two possible alternative examples of Signal Condition are given, Signal Condition A shown connected by dotted lines comprises earth on ZA and −50 volts via a resistor on ZB, whilst Signal Condition B shown connected by chain dotted lines comprises −12 volts via resistors to both ZA and ZB. Other combinations of voltage or current values are used to designate other Signal Conditions. The Signal Condition indicates to the control register the type of stage to which the former is connected, for example Signal Condition A connected in a group selector stage might indicate that the stage requires two digits to operate it. Signal Condition B in a final stage indicates that the stage provides P.B.X conditions.

Assuming that Signal Condition A is connected, it will be applied to leads L3101 and L3102 during the slow-to-operate time of relay DB after the operation of relay DA.

Signal Condition A is now applied to leads L21, L22 of the D.C. Sender, FIG. 2, via normal contracts SC1 and SC2 and to leads L216 and L215 connected to leads L3216 and L3215 respectively, FIG. 32. Thus, −50 volts via resistor R3103, FIG. 31, terminal ZB, operated contact DA3, lead L3102, lead L22 FIG. 2 through normal contact SC2, L215, L3215, FIG. 32, rectifier MR3202, resistor R3203 is applied to transistor VT3201 to −30 volts on Zener diode MR3201, transistor VT3201 turns on and operates relay DSC causing transistor VT3202 to turn on which in turn causes transistor VT3203 to turn on. Transistor VT3203 connects earth to the junction of resistors R3208 and R3209 in order to prevent transistor VT3204 turning on.

The Signal Condition earth from terminal ZA, FIG. 31, appearing on lead L3216, FIG. 32, is connected by operated contact DSC2, rectifier MR3206, resistor R3210 to turn on transistor VT3205 and hence cause the operation of relay DSD.

The combination of operated contacts DSC1 and DSD1 in series connects earth to a lead individual to Signal Condition A connected to the control register storage unit where the Signal Condition is stored. When relay DB operates after the delay stated above, relay DA is released thereby removing the Signal Conditions. The earth received from the D.C. Sender, FIG. 2, on lead L3103 is connected by operated contact DB1 to lead L3133 which is joined to L143 FIG. 14 to operate relay BB.

If however, Signal Condition B is employed in which −12 volts is connected via resistor R3101 to terminal ZA and −12 volts is connected via resistor R3102 to terminal ZB, the −12 volt condition appears on both leads L3215 and L3216, FIG. 32, the potential on L3215 is applied via MR3205, resistor R3209 and resistor R3208 and turns on transistor VT3204 to operate relay DSA. The potential on lead L3216 via normal contact DSC2, rectifier MR3208, resistor R3212 turns on transistor VT3206 and operates relay DSB. The combination of operated contacts DSA1 and DSB1 in series connects earth to a lead individual to Signal Condition B connected to the control register storage unit where it is stored. Subsequently relay DB operates and relay DA releases thereby removing the Signal Condition. The earth received from the D.C. Sender, FIG. 2, on lead L3103 is connected by operated contact DB1 to lead L3133 which is joined to L143 FIG. 14 to operate relay BB. It will be appreciated that −12 volts on lead L3215 cannot cause the operation of transistor VT3201 because the emitter bias from rectifier MR3201 keeps rectifier MR3202 reversed-biased with respect to the −12 volts signal. Contact BB1 operated connects +50 v. via R143 FIG. 14 to Zener diode RZ146 and rectifier MR149 to earth. 12 v. from RZ146 is connected to the positive lead L141 via MR141 and R141, and to the negative lead L142 via MR142 and R142, this constituting the "Proceed-to-send" signal. 12 v. from RZ146 is also connected via MR141, R141 and MR145, and via MR142, R142 and MR146 to R145 and R146, and turns on transistor VT142 which prevents the operation of relay CP by preventing transistor VT143 turning on when the 12 v. (S) i.e. switched supply, is connected to R147. The 12 v. (S) switched supply is produced by contact BB2 operated, connecting 50 v. to R1411 and Zener diode RZ144. In the D.C. Sender, FIG. 2, the 12 v. "Proceed-to-send" signal is received on leads L21 and L22. On lead L21 via MR21 and R21 it turns on transistor VT21, and on lead L22 via MR22 and R2 it turns on transistors VT22. This allows transistors VT23 and VT24 to turn on and so cause relay SC to operate, thus proving the continuity of the transmission leads. Relay SC holds via MR27, R220, contact SD1 unoperated to contact SC4 operated.

Contacts SC1 and SC2 operated connect leads L21 and L22 respectively, to the first contacts of each of the relays A–D and W–Z. As already stated, one relay in each group is operated in accordance with the digit transmitted from the storage unit 16 of the control register 15, FIG. 1, and so a signal representing the stored digit is passed to the stage register, FIG. 14 via FIG. 31, in the form of a potential value connected to the positive lead L21, and a potential value connected to the negative lead L22. These signals are received on leads L141 and L142 respectively, in the stage register FIG. 14. Due to the current limiting resistor R143 the leads L141 and L142 fall to a potential below earth and transistor VT142 turns off, allowing transistor VT143 to turn on and operate relay CP, which locks via R144 to contact CP1 operated. Contact CP1 operated disconnects the 12 v. "Proceed-to-send" signal from leads L141 and L142. Contact CP2 operated connects lead L144 to lead L154, FIG. 15, connected to the detector circuits VT151–154 which receive the signals sent over the positive lead L21 of the D.C. Sender FIG. 2, and contact CP3 operated connects in like manner, lead L145 to lead L165, FIG. 16, connected to the detector circuits VT161–164, which receive the signals sent over the negative lead L22 of the D.C. Sender, FIG. 2.

Figure 15:
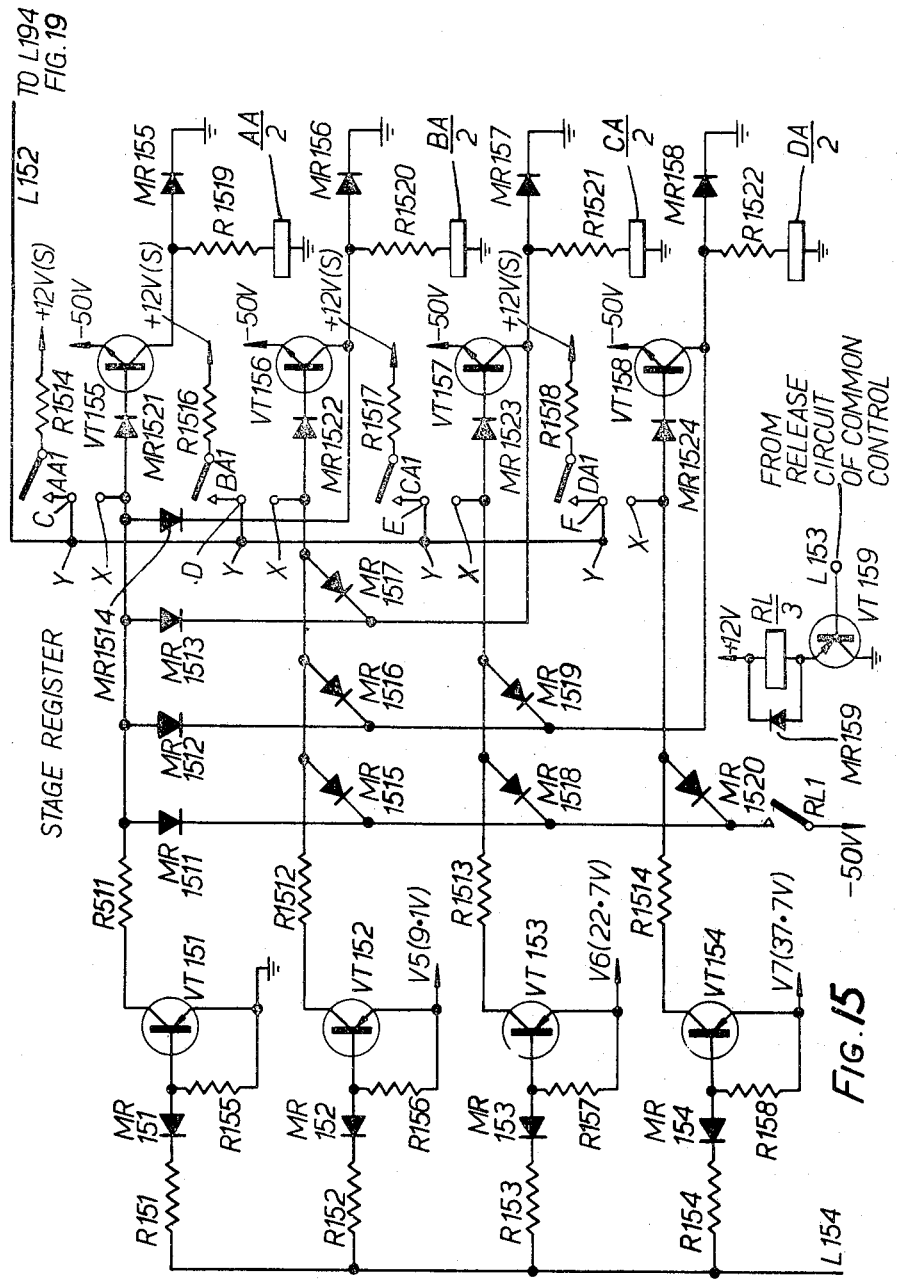

The operation of the detector circuit responsive to signals sent on the positive lead and shown in FIG. 15, is similar to that of the detector circuit responsive to signals sent on the negative lead, and shown in FIG. 16, and in this description, the operation of the detector circuits will be described in relation to the positive lead and FIG. 15 only.

In the D.C. sender, FIG. 2, four different signals can be sent via contact SC1 operated, connected to the positive lead L21. These consist of four discrete potential values obtained from points on the chain of Zener diodes RZ21–25 and from R27. The four send potentials are V1 from the point between RZ21 and RZ22, V2 from between RZ23 and RZ24, V3 from between RZ25 and R212 and V4 from R27.

V1 is connected when relay A is operated, V2 when relay B is operated, V3 when relay C is operated and V4 when relay D is operated.

The operation in FIG. 15 of these signals sent on the positive lead L21, FIG. 2 via lead L141, FIG. 14, to lead L154, FIG. 15, is as follows:

Send potential V1 turns on transistor VT151, the emitter of which is connected to earth.

Send potential V2 turns on transistors VT151 and VT152, the emitter of VT152 connected to V5.

Send potential V3 turns on transistors VT151, VT152 and VT153, the emitter of VT153 connected to V6.

Send potential V4 turns on transistors VT151, VT152, VT153 and VT154, the emitter of VT154 connected to V7.

Potentials V5, V6 and V7 are derived from Zener diode chain RZ141–RZ144, FIG. 14.

Transistor—
    VT151 turns on transistor VT155
    VT152 turns on transistor VT156
    VT153 turns on transistor VT157
    VT154 turns on transistor VT158

But, due to the diode matrix 1511–1520, the highest numbered transistor in the series VT155–158, inhibits all lower numbered transistors and hence for any one of the send signal potentials V1–V4, one only of the transistors VT155–158 will remain turned on. The turned-on transistor operates its associated relay as follows:

Transistor—
    VT155 operates relay AA
    VT156 operates relay BA
    VT157 operates relay CA
    VT158 operates relay DA It will be appreciated that the operating time of a relay is so much greater than that of a transistor, that although more than one transistor in the series VT155–158 may be initially turned on, those, with the exception of the highest numbered, will be inhibited and turned off, before their associated relays have had a chance to operate. For example, if transistors VT151, VT152 and VT153 are turned on as a result of signal V3 being received, VT155, VT156 and VT157 will be turned on, but VT157 inhibits VT156 via MR1517 and VT155 via MR1513, so that only VT157 remains turned on, and only the associated relay CA will be operated.

For any digit signalled from D.C. sender, FIG. 2, it should be remembered that a potential is connected to each of the two leads L21 and L22. The signal on lead L21 is received by the detector of FIG. 15 as already described, while the signal on lead L22 is received in like manner by the detector on FIG. 16. Thus, as a result of sending a digit from D.C. sender, FIG. 2, one of the relays AA–DA, FIG. 15 is operated, and one of the relays WA–ZA, FIG. 16 is operated. The combination of those two operated relays, characterises the sent digit, and in FIG. 14, the series connected contacts of the two operated relays connects −50 v. via R149 to mark the individual lead of leads L1411–1426 representative of the received digit. For example, if the digit 9 is sent from D.C. sender, FIG. 2, this results in relays CA and WA being operated in the stage register, FIG. 14, so that −50 v. via R149, contact CA2 operated and contact WA4 operated, marks output lead L1419 of the output leads L1411–1426. −50 v. connected to R149 and the marked lead in the leads L1411–1426 appears on the corresponding lead in the leads L1811–1826 in FIG. 18 and the corresponding lead of leads L1711–1726, FIG. 17. In FIG. 18, relays 1RA–16RA are parallel connected to lead L181 joined to lead L191, FIG. 19, and unoperated contact S1 to earth. In FIG. 17, relays 1RB–16RB are parallel connected to lead L173 joined to lead L193, FIG. 19, in turn connected to contact S1 and because this contact is not operated, lead L193 is not earthed. The marked lead of leads L1811–1826, FIG. 18, causes the corresponding relay of relays 1RA–16RA to operate. On the subsequent removal of the received digit signal and the consequent removal of the mark condition on the lead in the series L1811–1826, the operated relay holds via earth from a rectifier such as rectifier MR1801 for relay 1RA via operated contact 1RA1, resistor R181 to +50 v. As well as holding the marked RA relay, the +50 v. via resistor R181 and the operated relay contact such as 1RA1 is connected via diode MR1833 to lead L182 connected via lead L192, FIG. 19, to the base of transistor VT191, FIG. 19. Transistor VT191 which was previously conducting is turned off allowing transistor VT192 to turn on via resistors R192 and 193. Transistor VT192 extends earth from unoperated contact S1 rectifier MR192 to lead L196 joined to lead L142, FIG. 14. This constitutes the "digit acknowledge" signal and causes the D.C. sender, FIG. 2, to remove the digit previously sent. Removal of the digit in the sender removes the code signal condition from the leads L21 and L22, FIG. 2, and thus causes the operated code relay in the series AA–DA, FIG. 15, and the operated code relay in the series WA–ZA, FIG. 16, to release. On the release of the operated relays in the series AA–DA and WA–ZA, +12 v. (S) is removed from lead L152, FIG. 15, and lead L161, FIG. 16, and thus from lead L194, FIG. 19, to which those leads are connected, thereby allowing transistor VT193 to turn on via resistor R195 to −50 v. With transistor VT193 turned on, an operated contact such as 1RA2 operates relay S.

Operated contact S1, FIG. 19, removes the earth from the emitter of transistor VT192 thus removing the "digit acknowledge" signal from lead L196. Operated contact S1 also removes earth from lead L191 and lead L181, FIG. 18. Operated contact S1 connects earth via lead L193 to lead L173, FIG. 17 in readiness for the receipt of the next digit. The earth from operated contact S1 is extended via diode MR197 to the capacitor C191 which was previously charged to near −50 v. via resistor R196, MR198 and VT194 to earth and causes the reversal of the charge on capacitor C191 to turn off transistor VT194.

Transistor VT194 now turned off allows transistor VT195 to turn on via resistors R198, R199, earth from contact S1 and rectifier MR196. Transistor VT196 also turns on via resistor R1913 and extends −12 v. via resistor R1914 to lead L195 joined to lead L146, FIG. 14, to turn off transistor VT143 and release relay CP. On the release of contact CP1 another "Proceed-to-send" signal is sent by connecting +12 v. to leads L141 and L142 as already described.

Meanwhile in FIG. 19, capacitor C191 discharges exponentially via resistor R197 to −50 v. and after approximately 5 milliseconds transistor VT194 is turned on again via resistor R197 causing transistors VT195, 196 to be turned off thus removing the −12 v. from lead L195 connected to lead L146, FIG. 14.

A second digit is now sent by the D.C. sender, FIG. 2, in response to the transmission of the "Proceed-to-send" signal. The second digit is received in the stage register in a manner similar to that already described for the first digit except that, because relay S, FIG. 19, is now operated, the received second digit causes the operation of the appropriate relay in the series 1RB–16RB, FIG. 17, the relay operating from earth on operated contact S1, FIG. 19, lead L193 connected to lead L173, FIG. 17, to the marked lead of leads L1711–1726.

Having received two digits in the stage register there is one relay operated in the series 1RA–16RA, FIG. 18, and one relay operated in the series 1RB–16RB, FIG. 17.

The translation field shown in FIG. 20 is used to decode the combination of the two operated relays into a one-out-of-sixteen operation of a relay in the series 1R–16R. For example, the dotted lines in the translation field show the connection for the received digits 21 translated to the digit 1. Receipt of the digits 21 result in the operation of the relays 2RA and 1RB. Operated contacts 2RA3 and 1RB1 each connect earth to their respective gates the outputs of which are wired to terminal 1 of the output terminals 1–16 on the output side of the translation field. Thus, transistor VT2011 is turned on and relay 1R is operated. Relay 1R locks via operated contact 1R1 and common resistor R201 to +50 v. Contact 1R2 connects earth via output 1 to the common control which then proceeds to set the A and B switches of the stage via its output leads 108, 109, FIG. 1. Operated contact 1R3 connects −50 v. via resistor R202 to lead L207 connected to lead L147, FIG. 14, which via link B, resistor R1412 and diode MR148, turns on transistor VT144 to operate relay SR. Operated contact SR1 returns a "digit acknowledge" signal as earth on lead L142 to the D.C. sender, FIG. 2, causing the second digit to be removed from the latter in a manner similar to that described above for the first digit.

When the common control has responded to the signal from the operated contact 1R2 on output 1, the common control returns a condition on lead L153, FIG. 15, to turn on transistor VT159 and thus operate relay RL. Operated contact RL3, FIG. 14, connects earth via link A and lead L148 to lead L188, FIG. 18, to shunt the +50 v. via R181 causing the release of the operated relay 1RA. Earth is also connected to lead L208, FIG. 20, to shunt the +50 v. via R201 thus releasing the operated 1R relay. The relay operated in the series 1RB–16RB does not lock and is released when the second digit is removed from the D.C. sender.

Figure 16:
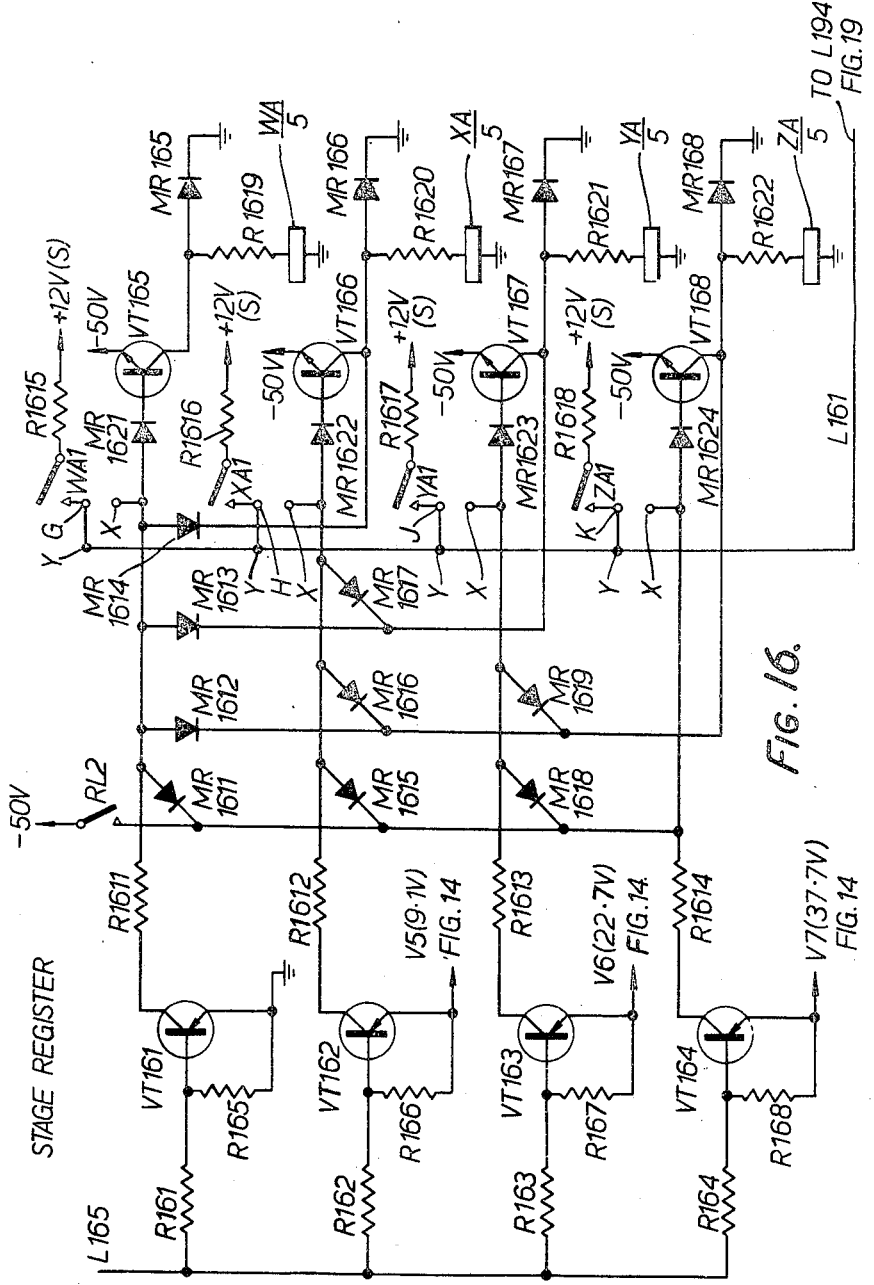
Figure 17:
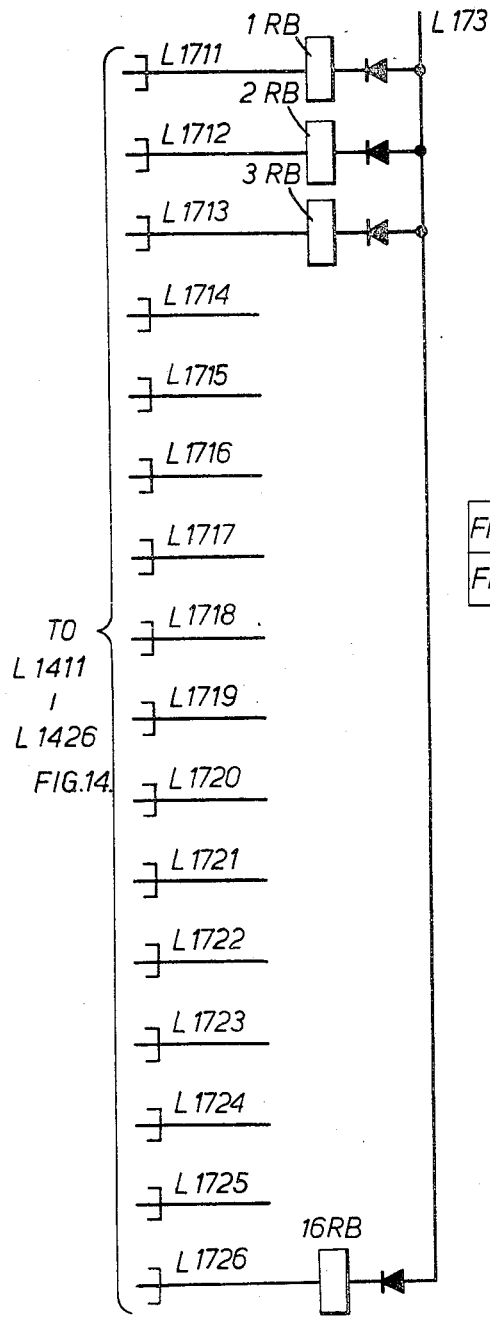

The embodiment just described with reference to FIGS. 2, 14–20, 31 and 32 is intended to operate on a two-digit basis and circuitry appropriate to that basis is given. Also shown are alternative connections which are used when a one-digit basis of operation is required. Thus, FIGS. 14, 15, 16, show terminals x, y of which terminals y are shown connected in circuit by links A, B, FIG. 14, C, D, E and F. FIG. 15, and G, H, J and K, FIG. 16, to provide the two-digit basis. Terminals x are not connected unless one-digit operation is required in which case the links just mentioned connect to the appropriate x terminal.

The connection is still held by the control register and any further digits stored in the control register 15, FIG. 1, for routing the call will be passed to the next stages in a similar manner.

The "signal detected" signal sent back from stage register FIG. 14 to the D.C. sender, FIG. 2, is not restricted to earth on the negative lead L142 as described, but can take the form of earth on the positive lead L141, or earth on both of the leads L141 and L142, each of the conditions causing, in the D.C. sender FIG. 2, the operation as described, and another operation signifying additional information. Additional circuitry required in FIG. 2 for the reception of signals sent back on lead L21 and on both L21 and L22 is not shown, but will be apparent to those skilled in the art.

A fourth embodiment in which the send signals are discrete current values will now be explained in conjunction with FIGS. 7, 8, 22–28, 31 and 32, arranged as in FIG. 29, which show a D.C. sender connected to a stage register as in FIG. 1 and in which:

FIGS. 7, 8 and 32 depict the D.C. sender, and
FIGS. 22–28 and 31 depict the stage register.

As soon as the translation has been stored in storage unit 16 of control register 15, FIG 1, the storage unit seizes the D.C. sender, FIGS. 7, 8 and 32, and operates relay SA over lead L815 and at the same time transmits the first digit which is stored in the D.C. sender on the basis of a 1 out of 4 code in each set of leads L81–84 and L811–814, each digit being characterised by the combination of one relay operated in each group of relays A–D connected to leads L81–84 and relays W–Z connected to leads L811–814. The combination of 1 out of 4 twice allows 16 discrete signals which, for example, can be made up of the ten digits 0–9 and six other signals as required. The 16 signals could be characterised as follows:

Signal:
1 digit 1 relays A and W
2 digit 1 relays A and X
3 digit 3 relays A and Y
4 digit 4 relays A and Z
5 digit 5 relays B and W
6 digit 6 relays B and X
7 digit 7 relays B and Y
8 digit 8 relays B and Z
9 digit 9 relays C and W
10 digit 0 relays C and X
Signals as required:
11 relays C and Y
12 relays C and Z
13 relays D and W
14 relays D and X
15 relays D and Y
16 relays D and Z Contact SA1, FIG. 7, connects earth to signal lead L73 connected to lead L3103, FIG. 31, where, via normal contacts DB1, the earth operates relay DA. Operated contact DA1 provides an operate circuit for slow-to-operate relay DB of say 10–30 milliseconds slow operation. Operated contact DA2 and DA3 apply the Signal Condition connected to terminals ZA and ZB to leads L3101 and L3102 respectively connected to leads L71, L72 respectively in the D.C. sender, FIG. 7. The Signal Condition applicable to the particular stage is connected to terminals ZA, ZB. In FIG. 31, two possible alternative examples of Signal Condition are given, Signal Condition A shown connected by dotted lines comprises earth on ZA and −50 volts via a resistor on ZB, whilst Signal Condition B shown connected by chain dotted lines comprises −12 volts via resistors to both ZA and ZB. Other combinations of voltage or current values are used to designate other Signal Conditions. The Signal Condition indicates to the control register the type of stage to which the former is connected, for example Signal Condition A connected in a group selector stage might indicate that the stage requires two digits to operate it. Signal Condition B in a final stage indicates that the stage provides P.B.X conditions.

Assuming that Signal Condition A is connected, it will be applied to leads L3101 and L3102 during the slow-to-operate time of relay DB after the operation of relay DA.

Signal Condition A is now applied to leads L71, L72 of the D.C. sender, FIG. 7, via normal contacts SC1 and SC2 and to leads L716 and L715 connected to leads L3216 and L3215 respectively, FIG. 32. Thus, −50 volts via resistor R3103, FIG. 31, terminal ZB, operated contact DA3, lead L3102, lead L72, FIG. 7, through normal contact SC2, L715, L3215, FIG. 32, rectifier MR3202, resistor R3203 is applied to transistor VT3201 to −30 volts on Zener diode MR3201, transistor VT3201 turns on and operates relay DSC causing transistor VT3202 to turn on which in turn causes transistor VT3203 to turn on. Transistor VT3203 connects earth to the junction of resistors R3208 and R3209 in order to prevent transistor VT3204 turning on.

The Signal Condition earth from terminal ZA, FIG. 31, appearing on lead L3216, FIG. 32, is connected by operated contact DSC2, rectifier MR3206, resistor R3210 to turn on transistor VT3205 and hence cause the operation of relay DSD.

The combination of operated contacts DSC1 and DSD1 in series connects earth to a lead individual to Signal Condition A connected to the control register storage unit where the Signal Condition is stored. When relay DB operates after the delay stated above, relay DA is released thereby removing the Signal Conditions. The earth received from the D.C. sender, FIG. 2, on lead L3103 is connected by operated contact DB1 to lead L3133 which is joined to L223, FIG. 22, to operate relay BB.

Figure 22:
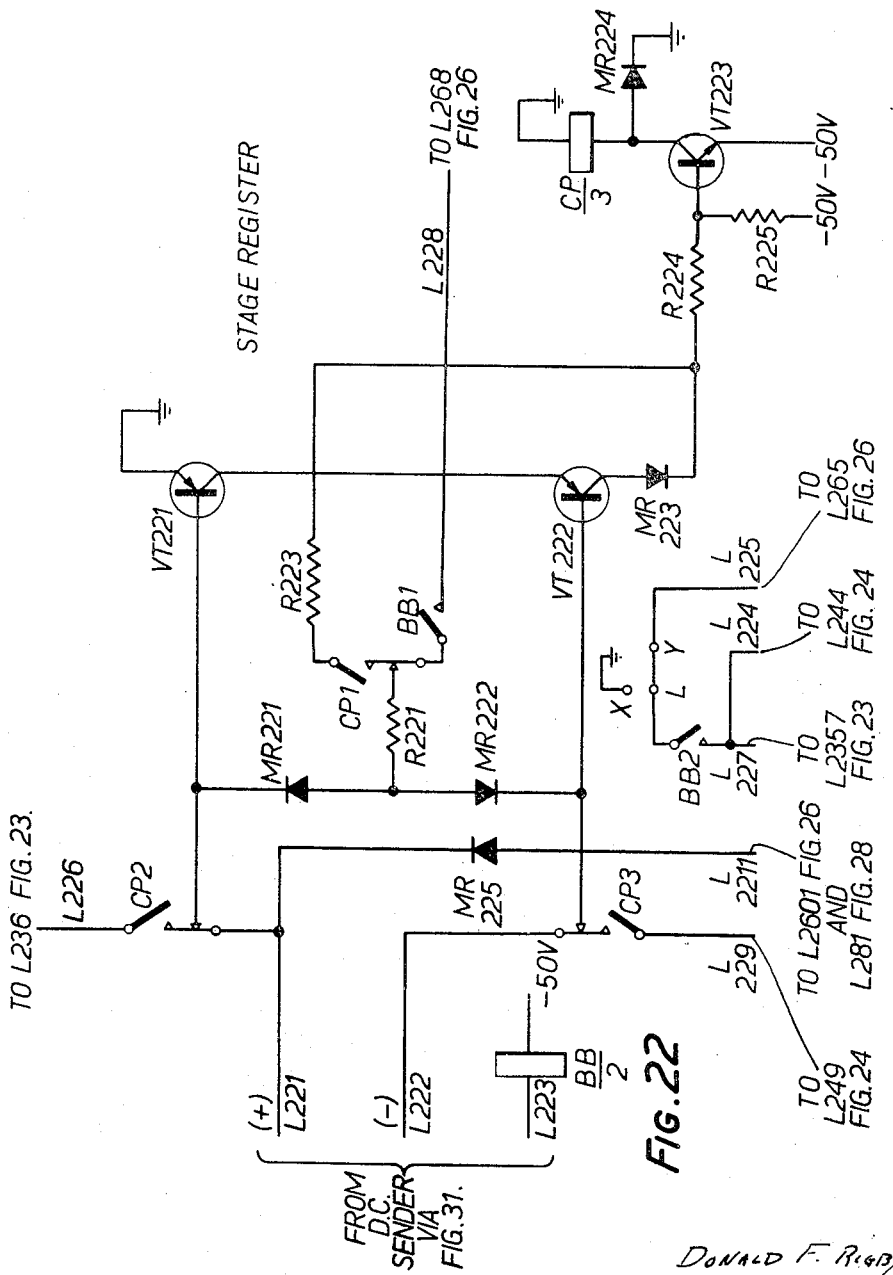

If however, Signal Condition B is employed in which −12 volts is connected via resistor R3101 to terminal ZA and −12 volts is connected via resistor R3102 to terminal ZB, the −12 volt condition appears on both leads L3215 and L3216, FIG. 32, the potential on L3215 is applied via MR3205, resistor R3209 and resistor R3208 and turns on transistor VT3204 to operate relay DSA. The potential on lead L3216 via normal contact DSC2, rectifier MR3208, resistor R3212 turns on transistor VT3206 and operates relay DSB. The combination of operated contacts DSA1 and DSB1 in series connects earth to a lead individual to Signal Condition B connected to the control register storage unit where it is stored. Subsequently relay DB operates and relay DA releases thereby removing the Signal Condition. It will be appreciated that −12 volts on lead L3215 cannot cause the operation of transistor VT3201 because the emitter bias from rectifier MR3201 keeps rectifier MR3202 reversed-biassed with respect to the −12 volts signal. Operated contact BB1 connects +50 v. from transistor VT266, FIG. 26, resistor R2613, lead L268 via normal contact CP1, FIG. 22, to resistor R221 and via diode MR221 and normal contact CP2 to the positive lead L221, and via diode MR222, normal contact CP3 to the negative lead L222, this condition on leads L221 and L222 constituting the "Proceed-to-send" signal. Lead L221 is connected to lead L71, FIG. 7 via FIG. 31, and the signal on this lead via normal contact SC1, diode MR73 and resistor R78 turns on transistor VT73. Lead L222, FIG. 22, is connected to lead L72, FIG. 7 via FIG. 31, and the signal on this lead via normal contact SC2, diode MR74 and resistor R79 turns on transistor VT74. Transistors VT73 and VT74 turned-on, cause transistor VT72 to turn on and so cause transistor VT71 to turn on and operate relay SC to lead L79 connected to lead L89, FIG. 8, which has earth connected by an operated contact of one of the relays A–D due to storage of received information. Operated contacts SC1 and SC2, FIG. 7, connect leads L71 and L72 to leads L75 and L76 respectively. Operated contact SC3 connects earth via normal contacts SD1 and resistor R71 to hold transistor VT71 turned on, and also connects earth via diode MR79 to lead L77 connected to lead L88, FIG. 8. The earth on lead L88 is connected via resistor R89 to bias Zener diode RZ82. This clamps the bases of the constant current generator transistors VT81 and VT82 to a voltage determined by −50 v. minus the voltage of Zener diode RZ82. Resistance is connected in the emitter circuits of transistors VT81 and VT82 depending on the relay contacts in the sets of contacts A1–D1 and W1–Z1 that are operated and this resistance determines the emitter current and hence, very nearly, the collector current. Contacts A1–D1 are associated with resistors R81–84 and contacts W1–Z1 with resistors R85–88, respectively. Typical values of current for the four signals determined by the four contacts A1–D1 and W1–Z1 are:

| Signal: | Ma. |
| --- | --- |
| 1st | 1.10 |
| 2nd | 2.25 |
| 3rd | 4.70 |
| 4th | 9.40 |

The signal currents from the collectors of transistors VT81 and VT82 flow via leads L85 and L86 connected to leads L75 and L76, FIG. 7, respectively, via operated contacts SC1 and SC2 to leads L71 and L72 connected to the stage register leads L221 and L222, FIG. 22 via FIG. 31, which, via normal contacts CP2 and CP3, diodes MR221 and MR222 respectively, common resistor R221, normal contact CP1, operated contact BB1 and lead L228 to lead L268, FIG. 26, and VT266 to +50 v. Resistor R221 is of such a value that the lowest value of signal current is sufficient to swing the potential of leads L221 and L222 negative going and cause transistors VT221 and VT222 and thus VT223 to turn on and operate relay CP which holds via operated contact CP1. Operated contact CP2 extends lead L221 to lead L226 connected to lead L236, FIG. 23, and operated contact CP3 connects lead L222 to lead L229 connected to lead L249, FIG. 24. Current on lead L236, FIG. 23, turns on transistor VT231 and thus VT232, to operate relay P which locks via operated contact P2 to earth on lead L237 connected to lead L227, FIG. 22, and operated contact BB2 and lead L225 to lead L265, FIG. 26, to transistor VT267. Operated contact P3, FIG. 23, connects the emitter resistor R2304 of the register constant current generator transistor VT235 to +50 v. Positive current flows from transistor VT235 to meet the incoming negative current via lead L236. If the signal current is of the lowest magnitude, the current from transistor VT235 will tend to drive lead L236 positive and diode MR231 to conduct thus turning off transistors VT231 and VT232. If, however, a higher magnitude of current is received from lead L236, this lead will remain negative and transistors VT231 and VT232 will remain turned on. Earth from transistor VT232 will then be extended via operated contact P1 to operate relay Q. According to the signal received, this procedure of the comparator circuit of transistors VT231 and VT232 will continue. Contacts P3, Q3, R3 and S3 each connect a resistor, R2304, 2305, 2306 and 2307 respectively, in the emitter circuit of the constant current generator transistor VT235, in order to determine the positive collector current, which is used as a reference on lead L236 with the incoming negative current signal. Typical values of the four currents provided by contacts P3, Q3, R3 and S3 relative to the four signal current values stated for the D.C. sender are:

| | Ma. |
| --- | --- |
| P3 | 1.35 |
| Q3 | 2.75 |
| R3 | 5.15 |
| S3 | 11.40 |

When the comparator circuit is balanced, i.e. VT231 and VT232 turned off, earth is not extended to the next relay. A pattern is thus established as follows:

1st signal, relay P operated
2nd signal, relays P and Q operated
3rd signal, relays P, Q and R operated
4th signal, relays P, Q, R and S operated If, say, relays P, Q, and R are operated and the comparator circuit VT231 and VT232 is balanced, i.e. turned off, the disconnection by transistor VT232 of earth via diode MR237, turns off transistor VT233, thus turning on transistor VT234 and extending −50 v. to the inputs of resistors R2300–2303. The bases of transistors VT236 and VT237 will be shunted to earth via diode MR239 and operated contact Q2 and via diode MR2300 and operated contact R2 respectively. Thus transistor VT238 only will be turned on and extend earth to lead L233. Earth appears therefore on one of the leads L231–234 depending on the signal received. The relays P, Q, R and S are fast-acting relays, for example, reed relays.

Figure 23:
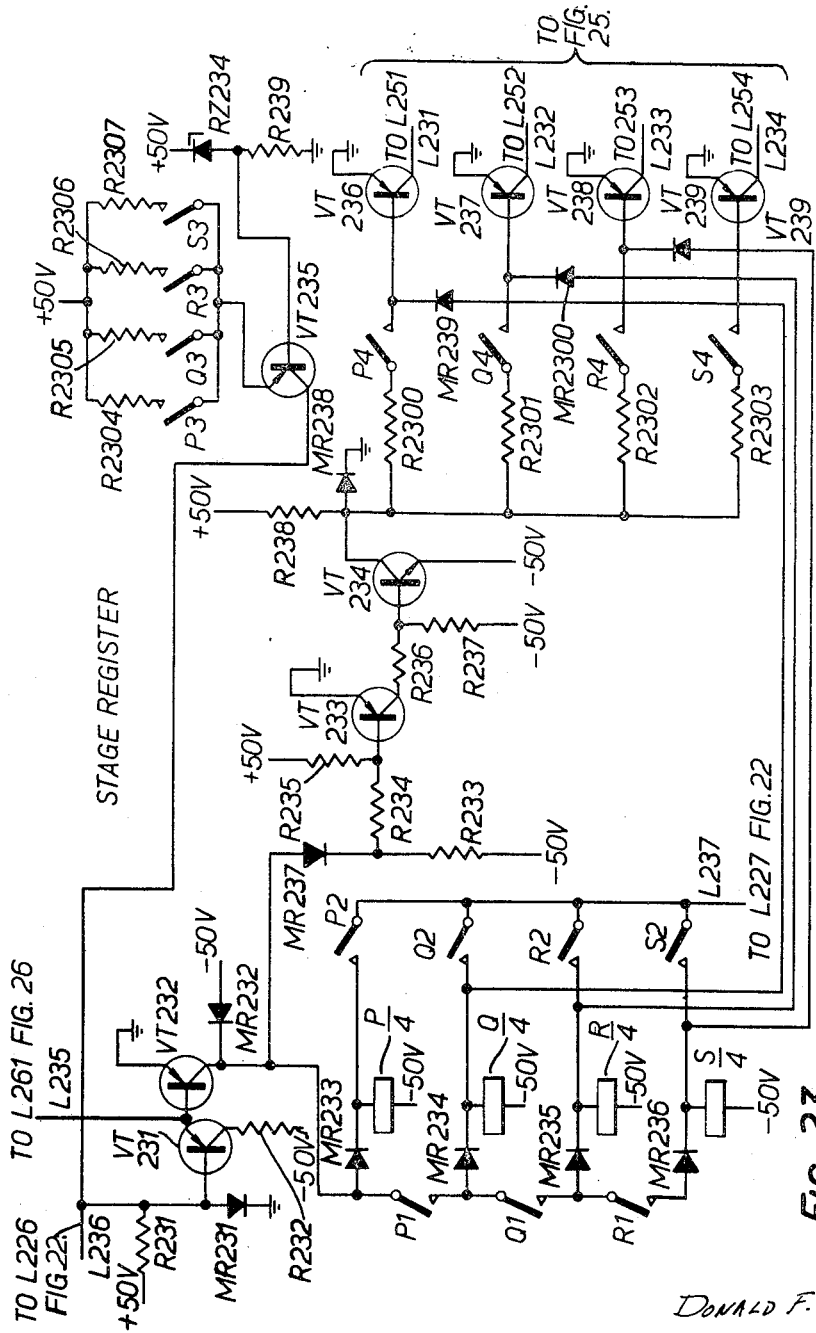
Figure 24:
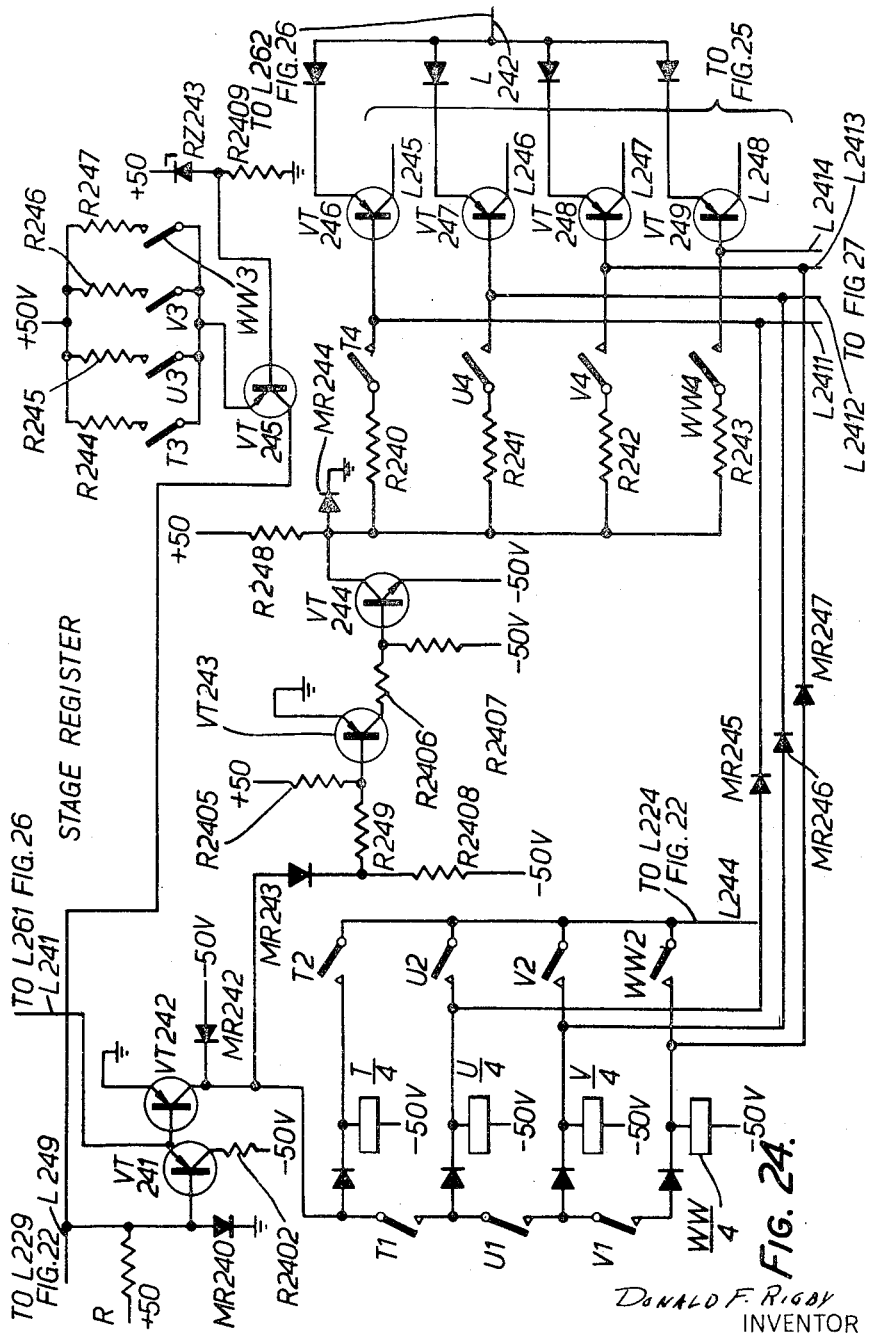
Figure 25:
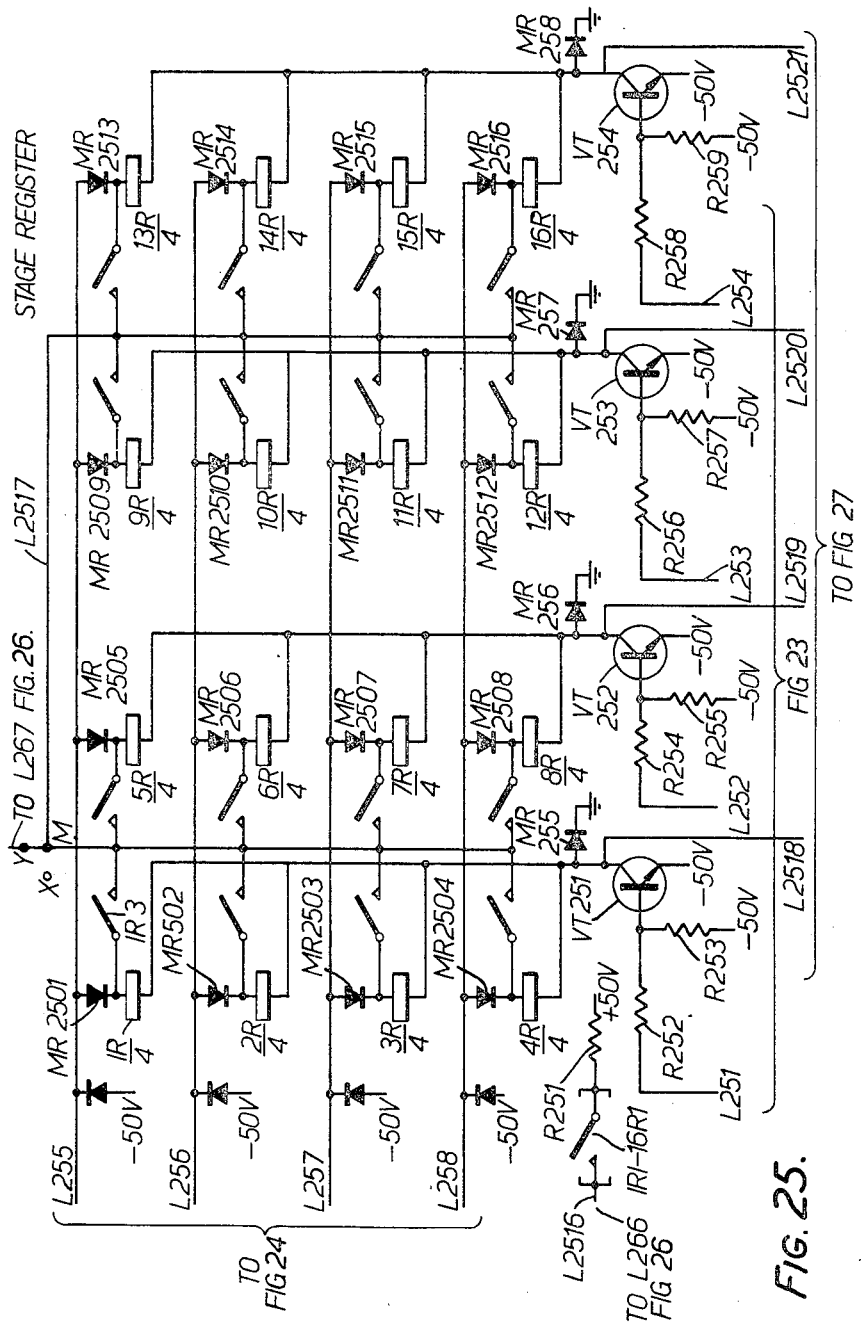
Figures 25A, 29:
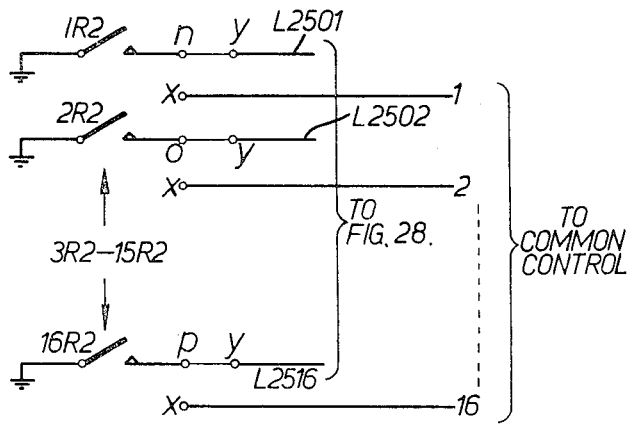

A similar operation occurs in FIG. 24 and an earth from normal contact SS1, FIG. 26 via lead L262 to lead L242 will be extended to one of the leads L245–248. Leads L231–234, FIG. 23, are connected to leads L251–254, FIG. 25, respectively, and leads L245–248, FIG. 24, are connected to leads L255–258, FIG. 25, respectively. Thus in FIG. 25 the two 1 out of 4 signals, one via one of the leads L255–258 and one via one of the leads L251–254 connected to transistors VT251–254 are gated together in the 16 relay matrix 1R–16R, resulting in one of the 16 relays being operated. The received one-out-of-four signal via leads L251–254, FIG. 25, and transistors VT251–254 is also applied via leads L2518–2521 to the relays 1RC–16RC in FIG. 27, but no relay in this series is operated as no earth is present on lead L279 connected to lead L269, FIG. 26. When one of the relays of the set 1R–16R, FIG. 25, is operated, its first contact, i.e. 1R1–16R1, connects +50 v. via resistor R251 to lead L2516 connected to lead L266, FIG. 26, via normal contact SS2 and diode MR262 to lead L2601, thus constituting the "digit acknowledge" signal. Resistor R251, FIG. 25, is of such a value that the lead L221, FIG. 22, and hence lead L71, FIG. 7, goes positive, and via operated contact SC1, diode MR76 and resistor R72 turns on transistor VT75 and operates relay SD. Operated contact SD1 connects earth from operated contact SC3 to lead L78 connected to the control register, FIG. 1, to indicate that another digit can be prepared for transmission to the D.C. sender. This will result in release of the relays operated in the relays A–D and W–Z and also of relay SA in FIG. 8. Contact SA1 released, removes earth from lead L73, FIG. 7, to release relay BB, FIG. 22. Operated contact SD1, FIG. 7, also removes the locking circuit of relay SC which releases. Contact SC1 released, releases relay SD. Should the acknowledgment signal persist on lead L71, FIG. 7, after the release of relay SC, only transistor VT73 will try to turn on and a false "Proceed-to-send" signal will not be given as transistor VT74 is not turned on.

Operation of one of the relays in the series 1R–16R, FIG. 25, for example 1R causes contact 1R3 to lock the relay to +50 v. via lead L2517 connected to L267, FIG. 26, via resistor R2619. The "digit acknowledge" signal, i.e. +50 v. via resistor R251, FIG. 25, on lead L2516 connected to lead L266, FIG. 26, normal contact SS2 and via diode MR266, turns off transistor VT267 and via diode MR2611 turns off transistor VT262 thus allowing transistor VT261 to turn on and extend earth via lead L261 to lead L241, FIG. 24, and to lead L235, FIG. 23, in order to render the comparator inoperative. In FIG. 23, the hold circuit of relays P–S over lead L237 and in FIG. 24, the hold circuit of relays T–WW over lead L244 are both connected in FIG. 22 via operated contact BB2 and lead L225 to lead L265 in FIG. 26.

When transistor VT267 turns off via lead L265, the hold circuit of relays P–S, FIG. 23, and T–WW, FIG. 24, is diverted to diode MR267 and resistor R2615 to transistor VT268. Resistor R2615 is of such a value that the hold circuit is below the release figure for the relays P–S and T–WW, the operated ones of which therefore release. On release, the cessation of current due to the opening of the relays' locking contacts P2–S2, FIG. 23, and T2–WW2, FIG. 24, turns off transistor VT268, FIG. 26, allowing transistor VT269 to turn on and operate relay SS via the operated contact 1R4 of contacts 1R4–16R4, FIG. 25, of relays 1R–16R. Operated contact SS1 provides holding earth for relay SS and also reconnects earth via diode MR268 to provide a full hold condition again on lead L265.

Meanwhile the operation of contact SS2 removes the "digit acknowledge" signal via diode MR262 and lead L2601 and also removes the inhibition from lead L261 by causing transistor VT262 to turn on and transistor VT261 to turn off.

Operated contact SS2 connects +50 v. from lead L2516, FIG. 25, and lead L266, FIG. 26, to turn on transistor VT263 which connects earth to the emitter of transistor VT265 and also causes the capacitor C261 to charge resulting in transistor VT264 turning off and thereby allowing transistor VT265 to turn on and transistor VT262 to turn off again and transistor VT261 to turn on again. With transistor VT261 turned on, earth is reconnected to lead L261 and thence to leads L235, FIG. 23, and L241, FIG. 24, in order to reinstate the inhibition on the comparator FIGS. 23 and 24 in order to allow relay SC in the D.C. sender, FIG. 7, time to release and remove the signal on the receipt of the "digit acknowledge" signal.

Transistor VT265, in turning on, causes transistor VT266 to turn on thereby removing the +50 v. condition via resistor R2613, lead L268 to lead L228, FIG. 22, operated contacts BB1, CP1, resistors R223 and R224 to turn off transistor VT223 to release relay CP.

When capacitor C261, FIG. 26, discharges in about 5 milliseconds, transistor VT266 turns on again causing, via lead L228, FIG. 22, operated contact BB1, normal contact CP1, resistor R221 and via MR221 normal contact CP2 to lead L221 and via diode MR222, normal contact CP3 to lead L222, a second "Proceed-to-send" signal to be sent back to the D.C. sender, FIG. 7 via FIG. 31, to cause transmission of the second digit in a manner similar to that of the first digit.

With the receipt of a second digit, one relay in each of the series P–S, FIG. 23, and T–WW, FIG. 24, is operated as before. Operation of one of the relays in the series P–S turns on one of the transistors VT236–239 to mark one of the leads L231–234 connected respectively to L251–254, FIG. 25, and so to turn on one of the transistors VT251–254, FIG. 25, and in turn to mark one of the leads L2518–2521 joined to L2718–2721, FIG. 27, respectively.

Operation of one of the relays in the series T–WW, FIG. 24, causes one of the leads L2411–2414 to be marked but this does not turn on one of the transistors VT246–249 because lead L242 connected to lead L262, FIG. 26, is not now earthed as contact SS1 is operated. Instead, the leads L2411–2414 connected to leads L271–274, FIG. 27, respectively are marked thereby turning on one of the transistors VT271–274.

With one of the leads L2518–2521 marked and one of the transistors VT271–274 turned on, one of the relays in the series 1RC–16RC is operated.

The combination of one relay operated in the 1R–16R series, FIG. 24, and one relay operated in the 1RC–16RC series, FIG. 27, is translated by a connection across the translation field shown in FIG. 28 resulting in one of the relays in the series 1RD–16RD being operated. The operated relay, for example 1RD, locks via resistor R281 to +50 v. Operated contact 1RD2 marks output 1 of the outputs 1–16 to the common control which then proceeds to set the A and B switches of the stage via its output leads 108, 109, FIG. 1.

Operated contact 1RD3 connects +50 v. via R282 to lead L281 connected to lead L2211, FIG. 22 and via diode MR225 to lead L221, constitutes the second "digit acknowledge" signal and causes the second digit to be removed from the D.C. sender.

When the stage register is released, relay BB, FIG. 22, releases and contact BB2 removes the holding earth from relays P–S in FIG. 23 and from relays T–WW, FIG. 24. These relays, on releasing, in turn release the operated relays in the series 1RC–16RC, FIG. 27.

The common control has responded to the marking condition on output 1 of the outputs 1–16, FIG. 28, and it returns earth on lead L267, FIG. 26, to shunt via resistor R2619 the hold circuit over lead L267 to lead L2517, FIG. 25, for the relay operated in the series 1R–16R, FIG. 25, the release of which releases relay SS in FIG. 26. The relay operated in the series 1RC–16RC does not lock and is released when the second digit is removed from the D.C. sender.

The embodiment just described with reference to FIGS. 7, 8, 22–28, 31 and 32 is intended to operate on a two-digit basis and circuitry appropriate to that basis is given. Also shown are alternative connections which are used when a one-digit basis of operation is required. Thus, FIGS. 22 and 25 show terminals $x$, $y$ of which terminals $y$ are shown connected in circuit by links L, FIG. 22, and M, N, O and P, FIG. 25. Terminals $x$ are not connected unless one-digit operation is required in which case the links just mentioned connect to the appropriate $x$ terminal. Link M is simply a connection-disconnection link although a terminal $x$ is shown for clarity.

The connection is still held by the control register 15 and any further digits stored in the control register for routing the call will be passed to the next stages in a similar manner.

The embodiment described above with reference to FIGS. 2, 14–20, 31 and 32 is intended for signalling to the switching stages of a telephone switching system where the signalling paths are short and consequently of relatively low D.C. resistance. On longer lines higher signalling potentials will be necessary. Alternatively, current signalling incorporating the principles described above with reference to FIGS. 7, 8, 22–28, 31 and 32 could be used, the signalling current values being of the order of only several milliamps. Current signalling might be used to convey dialled signals from a subscriber's instrument to the exchange. The loop condition which constitutes the calling signal is broken to provide the necessary two signalling paths and the act of dialling inserts into the two lines resistances of a value appropriate to the digit to be sent. During dialling, the hold condition will be maintained from the exchange end of the subscriber's line.

In both embodiments described above a third wire is used to convey signals effecting initial seizure and hold of a connection but this is not essential but is convenient when signalling to switching stages within an exchange since a third wire is normally present for other reasons. Where the third wire is not present, as for instance in junctions between exchanges, it is possible to signal and hold over the speech path by using, for example, A.C. signals of a frequency outside but usually above the audio range, for example, 16 kc./s.

It will be necessary to provide a source of the A.C. signal in the control register access switch under the control of the D.C. sender, FIG. 1, during setting-up operations and of the subscriber's loop condition subsequently.

It will be understood that stage operation in response to more than two digits is possible, it being necessary to add further circuitry to cater for each additional digit to be stored.

In all the embodiments described above a third wire is used to convey signals effecting initial seizure and hold of a connection but this is not essential but is convenient when signalling to switching stages within an exchange since a third wire is normally present for other reasons. Where the third wire is not present, as for instance in junctions between exchanges, it is possible to signal and hold over the speech path by using, for example, A.C. signals of a frequency outside but usually above the audio range, for example, 16 kc./s.

It will be necessary to provide a source of the A.C. signal in the control register access switch under the control of the D.C. sender, FIG. 1, during setting-up operations and of the subscriber's loop condition subsequently.

For example, the first and second embodiments might employ the A.C. signal receiver shown in FIG. 30 and which is located in the stage register. A.C. signals transmitted over leads L91, L92, FIG. 9, are conveyed via leads L301, L302 to a tuned circuit comprising inductance I301 and capacitance C303, C304 whose output is rectified by diodes MR300, MR301 and capacitor C305 and applied to normally conducting transistor VT304. The output of the tuned circuit turns VT304 off which allows transistor VT305 to turn on and operate relay BB whose contacts perform the function of the contacts BB1, BB2 of relay BB shown in FIG. 9.

In the case of the third and fourth embodiments, it will be necessary to include not only the circuitry of FIG. 30 to operate relay BB but also a similar circuit tuned to a different frequency to produce the operation of relay DA described above with reference to FIG. 31. The A.C. signal of the different frequency will be transmitted for a time equal to the slow-to-operate time of relay DB after which the A.C. signal to operate relay BB is transmitted.

I claim:

1. A system comprising in combination a transmitter linked to a receiver by a transmission path having at least two conductors, the transmitter including conversion means for converting each different item of information to be sent by the transmitter to the receiver into a unique combination of a number of discrete currents or voltages, the number of discrete currents or voltages in the combination being not greater than the number of conductors, and causing each current of the combination to flow through or each voltage of the combination to be applied to a different one of the conductors, and in which the receiver comprises comparison means for comparing the currents flowing through or the voltages applied to the conductors with a set of standard reference currents or voltages to identify the combination, a circuit for transmitting a first signal over the transmission path to the transmitter when a combination of currents or voltages are to be made to flow through or be applied to the conductors, and a circuit for transmitting a second signal over the transmission path to the transmitter when the receiver has identified a combination of currents or voltages and the latter is to cease flowing or to be removed from the conductors.

2. A step-by-step switching system including a system as claimed in claim 1, the switching system comprising in combination a number of switching steps at least one of which includes the said receiver for receiving information representing at least two digits indicating a required switching of the stage, the said one stage also including a translator for translating the received information into routing instructions and control means for setting the switches of the stage according to the routing instructions and then releasing the receiver.

3. A step-by-step system as claimed in claim 2 in which the said receiver includes a received information store for storing the received information prior to translation.

4. A step-by-step switching system as claimed in claim 2 in which the said receiver includes an arrangement for initiating the transmission of information representing the first of the at least two digits and for acknowledging the receipt of each further digit as it is received by the receiver.

5. A step-by-step switching system as claimed in claim 2 and further comprising means for signalling information to each stage to control the setting of the switches thereof, and in which each stage includes means for identifying the type of stage, such identification being made before the stage transmits instructions initiating the signalling of the information required to set the switches of the stage.

6. A step-by-step system as claimed in claim 5 in which the information transmitted to the stage represents digits and in which the identification of the type of the stage indicates the number of digits to be signalled to the stage to set the switches of the latter.

References Cited

UNITED STATES PATENTS

| | | | |
|---|---|---|---|
| 2,559,601 | 7/1951 | Deakin | 179—18 |
| 2,620,400 | 12/1952 | Snijders | 179—18 |
| 2,693,504 | 11/1954 | Buchner | 179—18 |
| 2,999,227 | 9/1961 | Hezel et al. | 340—172 |
| 2,087,405 | 7/1937 | Humphries. | |
| 2,493,256 | 1/1950 | Lundkvist. | |
| 2,807,671 | 9/1957 | Warman. | |
| 3,009,021 | 11/1961 | Laas. | |
| 2,590,262 | 3/1952 | McAlpine. | |

WILLIAM C. COOPER, Primary Examiner

U.S. Cl. X.R.

179—86; 340—172